United States Patent [19]

Boys: John T.

[11] Patent Number: 5,126,585
[45] Date of Patent: Jun. 30, 1992

[54] UNINTERRUPTIBLE POWER SUPPLIES

[75] Inventor: Boys: John T., Birkdale, New Zealand

[73] Assignees: Auckland Uniservices Limited; Eagle Technology Group Limited; Electronic & Transformer Engineering Limited, all of Auckland, New Zealand

[21] Appl. No.: 540,146

[22] Filed: Jun. 19, 1990

[51] Int. Cl.⁵ .............................................. H02J 9/06
[52] U.S. Cl. ........................................ 307/66; 307/45; 307/75; 307/87; 320/48; 363/37
[58] Field of Search ............... 307/64, 65, 66, 75, 307/87, 45, 46, 48; 363/37, 14; 320/48, 57

[56] References Cited

U.S. PATENT DOCUMENTS

| | | | |
|---|---|---|---|
| 4,366,390 | 12/1982 | Rathmann | 307/66 |
| 4,709,318 | 11/1987 | Gephart et al. | 307/66 |
| 4,788,450 | 11/1988 | Wagner | 307/64 |
| 4,985,819 | 1/1991 | Mori et al. | 363/37 |

FOREIGN PATENT DOCUMENTS

WO89/01719 2/1989 PCT Int'l Appl. .
2111326 6/1983 United Kingdom .

OTHER PUBLICATIONS

"Hysteresis Current-Forced Three-Phase Voltage-Sourced Reversible Rectifier", I.E.E.E. Proceedings, vol. 136, No. 3, May 1989, by A. Green et al., pp. 113-120.

"Current-Forced Single-Phase Reversible Rectifier", I.E.E.E. Proceedings, vol. 136, No. 5, Sep. 1989, by J. Boys et al., pp. 205-211.

"Future Powersupplies Having Built-In Battery Back Up", INTELEC 87, Jun. 17, 1987, By G. Andersen et al., pp. 163-168.

"A Novel AC Uninterruptible Power Supply", INTELEC 87, Jun. 17, 1987, by F. Barzegar, pp. 521-524.

Primary Examiner—Jeffrey A. Gaffin
Attorney, Agent, or Firm—Young & Thompson

[57] ABSTRACT

Power supply apparatus is disclosed which can be configured as a power line filter or an uninterruptible power supply having a battery test on load capability. It comprises an input reversible rectifier connectable between an AC supply and a high voltage internal DC bus, a second reversible rectifier interconnecting storage batteries to the high voltage DC bus, and an output module supplying a desired DC output or an AC output. In use the voltage on the internal DC bus is maintained at a greater level than that of (a) the instantaneous repetitive peak of the incoming voltage, and (b) the peak battery storage voltage. Battery test means is provided by allowing the dumping of the charge stored within the storage batteries for a certain period at the maximum available rate into the internal bus and back into the AC supply through the said reversible rectifiers; meanwhile observing the extent of the battery voatage drop so caused.

9 Claims, 21 Drawing Sheets

UNINTERRUPTIBLE POWER SUPPLIES

FIELD

This invention relates to power supplies and has particular (though not sole) application to the provision of an uninterruptible power supply for mainframe and mini computers and other load critical situations. The invention also relates to buffering; protecting the load from damaging impulses delivered via the mains supply, and conversely protecting the mains supply from harmonic distortion as a result of current consumption peaks within each cycle. Typically this feature will form part of the uninterruptible power supplies of this invention but the invention could be provided as a separate power line filter.

BACKGROUND

An uninterruptible power supply (sometimes referred to as an "uninterruptible power system" but in both cases generally abbreviated to "UPS") is distinct from a standby power supply. In the event of a fault condition an UPS can maintain the supply electrical power to a critical load with no break and no perceptible discontinuity at the time of the fault. Such power supplies are essential for large computers where even momentary loss of power below the industry guideline of 16% below nominal level may cause a system shut-down at a very considerable cost. Furthermore under some conditions data may be lost and may be almost impossible to recreate thereby causing concern for financial transactions and other areas where security is important. Such supplies are therefore intrinsically different to a standby or back-up power supplies where a disruption of a few seconds before the alternate source can commence supply is not really critical. An ideal UPS would includes means to test itself and particularly whether its batteries are still capable of delivering full current, while under normal load, without interruption of the supply to its critical load.

CONVENTIONAL UPS TECHNOLOGY

Conventional UPSs operate in the manner shown in FIG. 1. Input power from an AC supply is transformed (in T1) and rectified (by R1) and used to charge a battery (B1). Power from this battery is then used to synthesise an output voltage waveform within the inverter I1 to supply the load through the transformer T2. In the event of a power supply failure the output is still driven by the battery so that no disruption occurs.

In this simple form the UPS has a number of characteristics. Usually the input power goes through a transformer so that when it is rectified the voltage produced is suitable for charging the battery. The output from the battery is inverted with an inverter to produce, commonly, a synthesised sinewave output which again goes through a transformer to produce a mains compatible output voltage. As the battery voltage varies the inverter waveforms must also vary to hold the fundamental output voltage constant.

When a UPS is implemented in this way it has a number of disadvantages:

It is not possible to test the battery on full load without disrupting the normal operation of the UPS. Some UPSs provide a battery level-of-charge indication but this may not reflect the capacity of their batteries—at some time in the future—to actually deliver the required amount of electric power.

As the battery voltage reduces with time during discharge it becomes more difficult to synthesise acceptable output waveforms while maintaining regulation.

The current taken by the rectifier may have significant harmonic content causing harmonic pollution of the utility power supply. The power factor of the input is likely to vary considerably from unity.

The input and output transformers are quite bulky, heavy and expensive.

The efficiency of the system is typically 80%.

SUMMARY OF THE INVENTION

It is an object of the present invention to go some way towards overcoming the above disadvantages in the provision of improved power supply apparatus and more particularly the provision of an improved uninterruptible power supply or one which will at least provide the public with a useful choice.

In one aspect the invention provides power supply apparatus comprising an input stage, a storage stage, an output stage, and at least one common bus; wherein said input stage includes an input from an AC supply, means for reversibly converting an incoming alternating current at first AC voltage into a direct current supplied to said at least one common bus at a DC bus voltage which is higher than said first AC voltage, and means for controlling said DC bus voltage; said storage stage comprises means for controllably storing charge which in use allows the charge to be returned to said at least one common bus to maintain the DC bus voltage within predefined limits; and said output stage includes means for regulating the output voltage.

Preferably the power supply apparatus is configured as an uninterruptible power supply wherein said storage stage comprises storage batteries, a reversible DC-DC converter between said at least one common bus and said storage batteries, and means for controlling the said reversible DC-DC converter to allow in use either (a) the batteries to draw current from said bus for charging or maintaining the charge in said batteries or (b) the batteries to supply current to said bus.

Preferably this power supply apparatus also includes a battery test means which in use allows the storage batteries to be tested under full load by causing said batteries to discharge power into said at least one common bus for a limited time and back into said AC supply via said reversible converting means, and means for monitoring the extent of battery voltage drop so caused.

Preferably the uninterruptible power supply has an AC input voltage and an AC output voltage, wherein the common bus is maintained at a DC bus voltage substantially greater than the expected peak AC input voltage, but is not otherwise a function of the input voltage.

Preferably the DC bus voltage is also substantially higher than the peak voltage of the required output voltage from the output stage.

Preferably the input rectifier means is of the reversible rectifier type to allow the instantaneous current consumption of the UPS to have the same waveform as the incoming voltage—that is to say that it mimics a pure resistance and causes minimal harmonic pollution of the utility supply.

Preferably the input rectifier means is of the reversible rectifier type in order to allow the battery means to be tested on full load; when said reversible rectifier operates in reverse to dump the power added to the bus(es) from the battery.

Preferably all voltage-translation stages are of the hysteretically controlled current-forced reversible rectifier configuration employing semiconductor switches as the switching elements, and operating, for medium to large UPSs, in the 5-15 KHz frequency band.

In another aspect the invention provides a UPS having an input capable of receiving an AC input at a first voltage, a DC bus operative at a bus DC voltage which is substantially higher than said first voltage, said input stage connected to said DC bus by rectifier means to supply said bus DC voltage, means for sensing a predetermined drop in said bus DC voltage, battery means capable of supplying said bus DC voltage when required, battery control means capable of connecting said battery means to said DC bus in response to the detection of said predetermined drop in said bus DC voltage, and an output stage connected to said DC bus.

Preferably the output stage consists of a reversible rectifier configuration as before, creating a sine-wave AC power waveform based on stored reference data. Preferably this is phase-locked to the input mains supply to avoid hazard, or transient impulses when the UPS is bypassed.

Preferably said battery control means allows the battery means to be charged from or (more usually) to draw a float current from the DC bus.

Preferably the said battery control means allows substantial currents to be drawn from the battery when the UPS is replacing the usual mains power supply, or during tests.

Preferably the UPS may be started from the mains supply—even if the batteries have no remaining charge.

Preferably the UPS may be used in conjunction with a local generator—wherein considerations of frequency instability and gradual introduction of heavy loads must particularly be taken into account.

Preferably each of the stages of the UPS is modular, so that the capacity or voltage requirements of the input/output/battery stage can be changed by connecting different modules to the DC bus, or by adding modules to become a larger capacity or even a multi-phase version of the single-phase device described below.

In another aspect the invention provides a power line filter capable of protecting the load from damaging impulses delivered via the mains supply, and conversely, protecting the mains supply from harmonic distortion as a result of current consumption peaks within each cycle.

DRAWINGS

The invention will now be described, by way of example only, with reference to the accompanying drawings in which:

FIG. 11 is a circuit diagram of part of a preferred embodiment of the UPS, showing circuit elements used to generate a PWM-like pulse train to ultimately drive the output reversible rectifier switches.

FIG. 12 is a circuit diagram of part of a preferred embodiment of the UPS, showing circuit elements used to drive the reversible rectifier switches that generate the output AC power.

Figure 20:
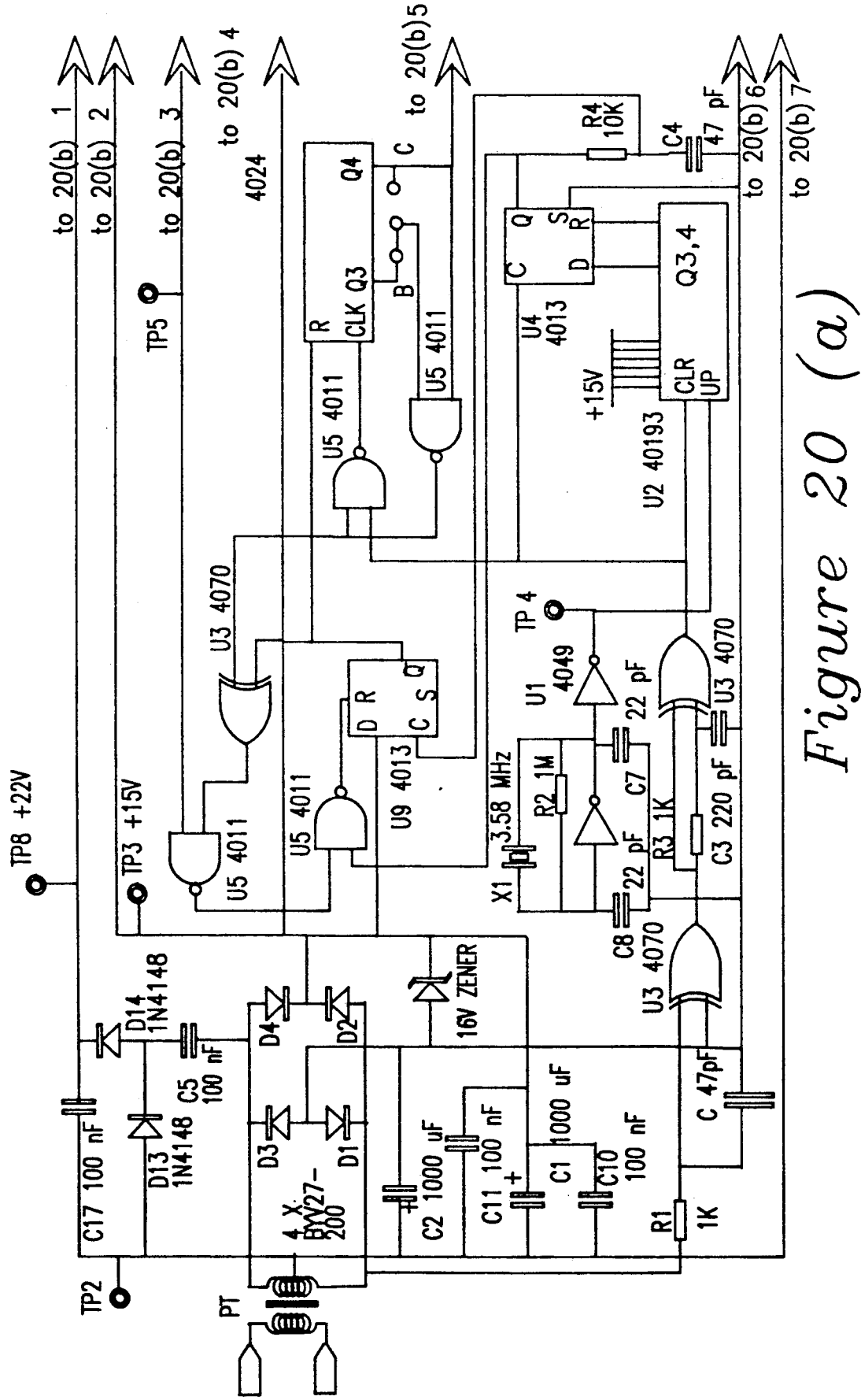
Figure 20B:
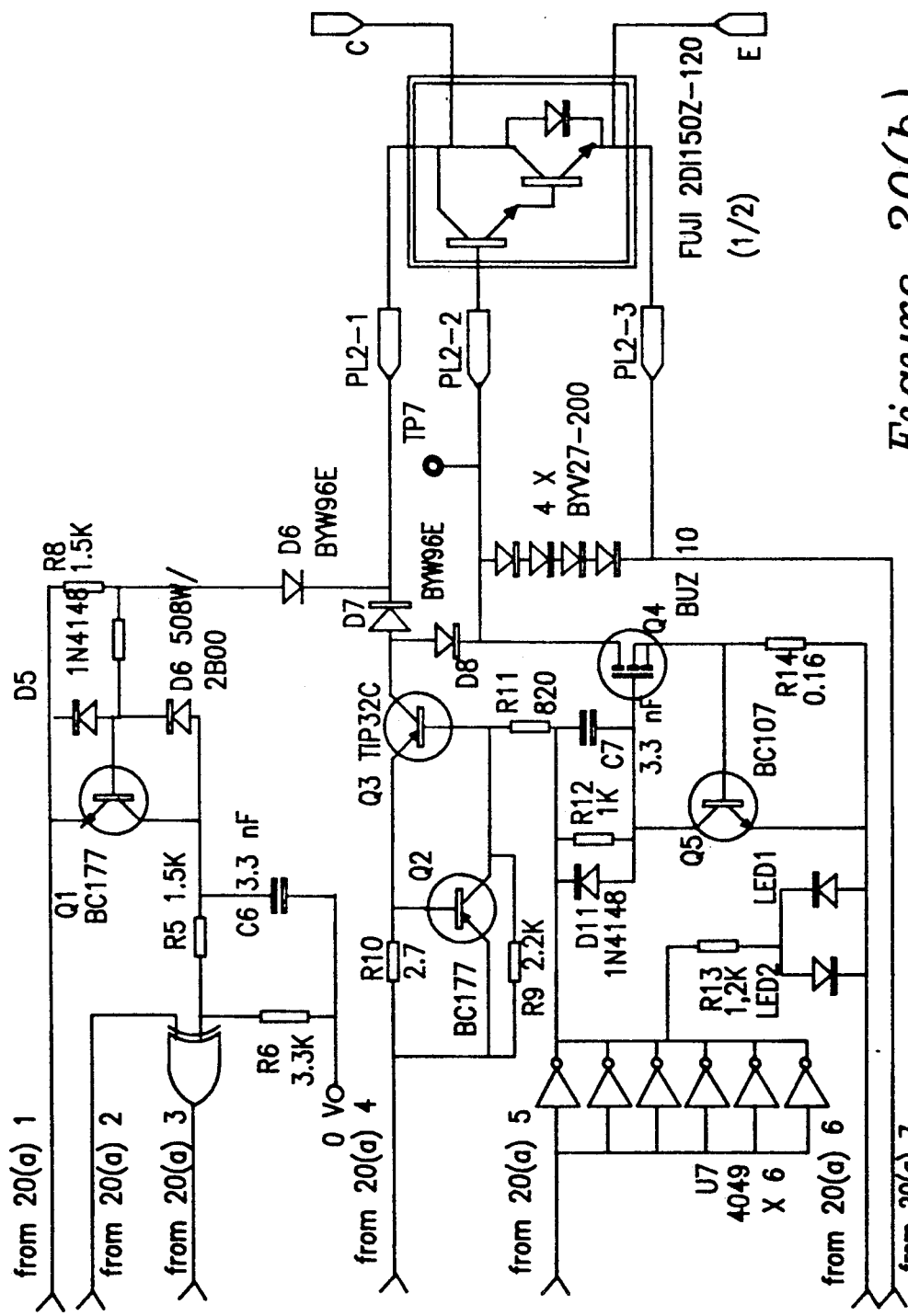

FIG. 20a and FIG. 20b together show a circuit diagram of part of a preferred embodiment of the UPS, showing those circuit elements that actually drive the (included) semiconductor switches of the reversible rectifiers. This circuitry floats at a high voltage and is powered through the pulse transformer.

PREFERRED EMBODIMENT

In the following description it will be noted that references to particular design approaches, currents, voltages or component values are for the purpose of illustration only and are in no way limiting because the invention can be embodied in many different configurations depending upon the supply voltage and number of phase lines, power rating, and number of inputs or outputs required.

In our prototype UPS designed for a nominal input AC supply of 230 volts, a split DC bus system is used and is maintained at some relatively high voltage—say 700 volts DC between buses—commensurate with ratings for modern power semiconductor devices.

The DC bus voltage is preferably significantly greater than the nominal AC supply voltage. For example if the supply voltage is 110 volts AC (as for single-phase lines in the USA) then the preferred DC bus voltage would be about 400 volts (200V each side of the neutral line).

By using the highest practical voltage the current rating of power switching devices for a given kVA or power level can be reduced. Since the cost of power semiconductors increases directly with current but less rapidly with voltage such a strategy gives the lowest cost power switching devices. An alternative strategy is simply to choose a bus voltage where the voltage x current rating for the power semiconductors is minimised. Such a strategy may be more appropriate with some power switching devices.

FIG. 2

In concept the advantages of a UPS with a DC bus system is that all elements of the UPS may be modular. There are three major elements: an input stage feeding the bus or buses (comprising L1, S1 and S2 with associated controllers), a battery control stage (comprising S3, S4, L2 with associated controllers), and an output stage (comprising S5, S6 and L3 with C3) and these will now be described with reference to FIG. 2. It should be appreciated that this configuration is equally capable of operating under DC supply, and/or DC load conditions, as the reversible rectifier is capable of acting as a DC-DC converter. In practice, virtually all utility supplies are AC although in some applications a DC output may be required.

The input stage preferably has a reversible rectifier capable of converting the nominal 230 volt AC input to the bus-to-bus voltage of say 700 volts; or 350 volts each side of neutral for one preferred embodiment.

The battery control stage preferably has a reversible rectifier acting as a DC-DC converter capable of supplying a battery charge voltage of for example 210 volts (for the preferred 90 cell battery) or a float voltage of for example 203 volts, and conversely the battery output can be stepped up to supply the bus voltage of 700 volts when required.

The output stage preferably has a further reversible rectifier stage acting as an inverter capable of supplying a nominal 110 or 230 volt AC output; in accordance with the input to the UPS, although in some applications it may be preferable to provide one or more DC-DC converters if an output DC voltage is required (e.g. running directly to the DC bus of a computer thereby bypassing the computers internal power supply).

Figure 2:
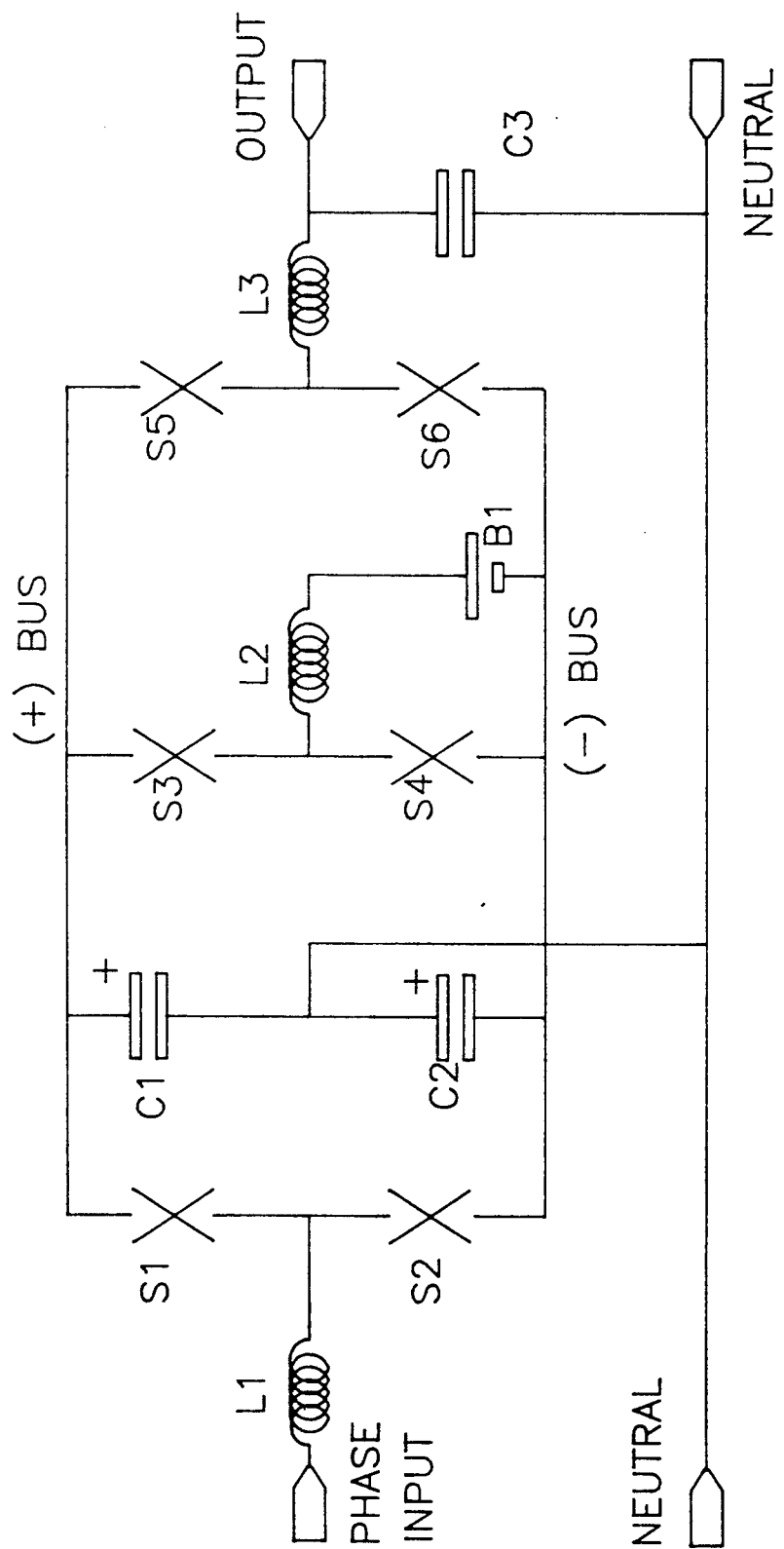
FIG. 2 is a schematic circuit diagram illustrating a UPS constructed in accordance with this invention, having an input stage, a battery control stage, and an output stage.

The DC bus system comprises a positive busbar and a negative busbar (labeled + and −) and two electrolytic capacitors C1 and C2 with their centre tap connected to the incoming neutral of a single phase supply. The capacitors, which have a reserve capacity corresponding to the duration of several cycles of the mains, are composed of one set of three 4700 microfarad 350 V capacitors (Sprague or Marcon) between each bus and ground. The input stage comprises inductor L1, and switches S1, and S2. The battery stage comprises switches S3 and S4, inductor L2 and battery B1. The output stage comprises switches S5 and S6, inductor L3 and capacitor C3. All these components are interconnected as shown in FIG. 2. Note that there is no interconnection between any of these stages - all stages simply connect from their respective source/sink to the DC bus.

Functionally the input stage operates by taking power from the input phase supply to maintain the DC bus system at its rated (say 700 volt) voltage. The battery stage takes power from the bus to maintain the battery voltage which may be of the order of 90 V and the output stage takes power from the bus to produce an output voltage waveform.

This is the normal operating mode for the UPS.

In the event of a power failure the input stage is no longer able to maintain the DC bus voltage which therefore sags. When the sag reaches say 1.5% the battery control stage changes its mode of operation and maintains the DC bus constant at that 1.5% sag. The output stage is not affected by such a small change in the DC bus voltage. Thus the battery maintenance stage has three modes of operation: battery charging, battery float, and DC bus maintenance. These modes are compatible with each other and present no design difficulties. There is also a fourth mode—battery test-under-load, which will be discussed later.

INPUT STAGE

The operation of the input stage will now be described since it may be operated with unity power factor. The prototypes proved to have power factors of 0.98 or better. Since the DC bus voltage is chosen to be higher than the crest AC input voltage, the current through inductor L1 may be completely controlled at all times. If we arbitrarily choose a sign convention that the instantaneous current inwards through L1 is positive when it is floating, then the current into the inductor from the mains supply may be increased by switching on S2 and decreased by switching on S1. Note that S1 or S2 are complementary and may never be on together. In this way by instantaneous point on wave comparisons and switchings, the current through L1 may be controlled to have any desired waveform at all. Preferentially therefore it is chosen to be a sinewave current exactly in phase with the input phase voltage.

When the power demand from the output stage is higher, the magnitude of this sinewave current is increased while maintaining the same perfect phase relationship. Power control is therefore simply achieved by controlling the magnitude of the phase current and a single PI (proportional + integral) controller may be used for this purpose as shown in outline in FIG. 3.

POWER CONTROL—FIG. 3

Figure 3:
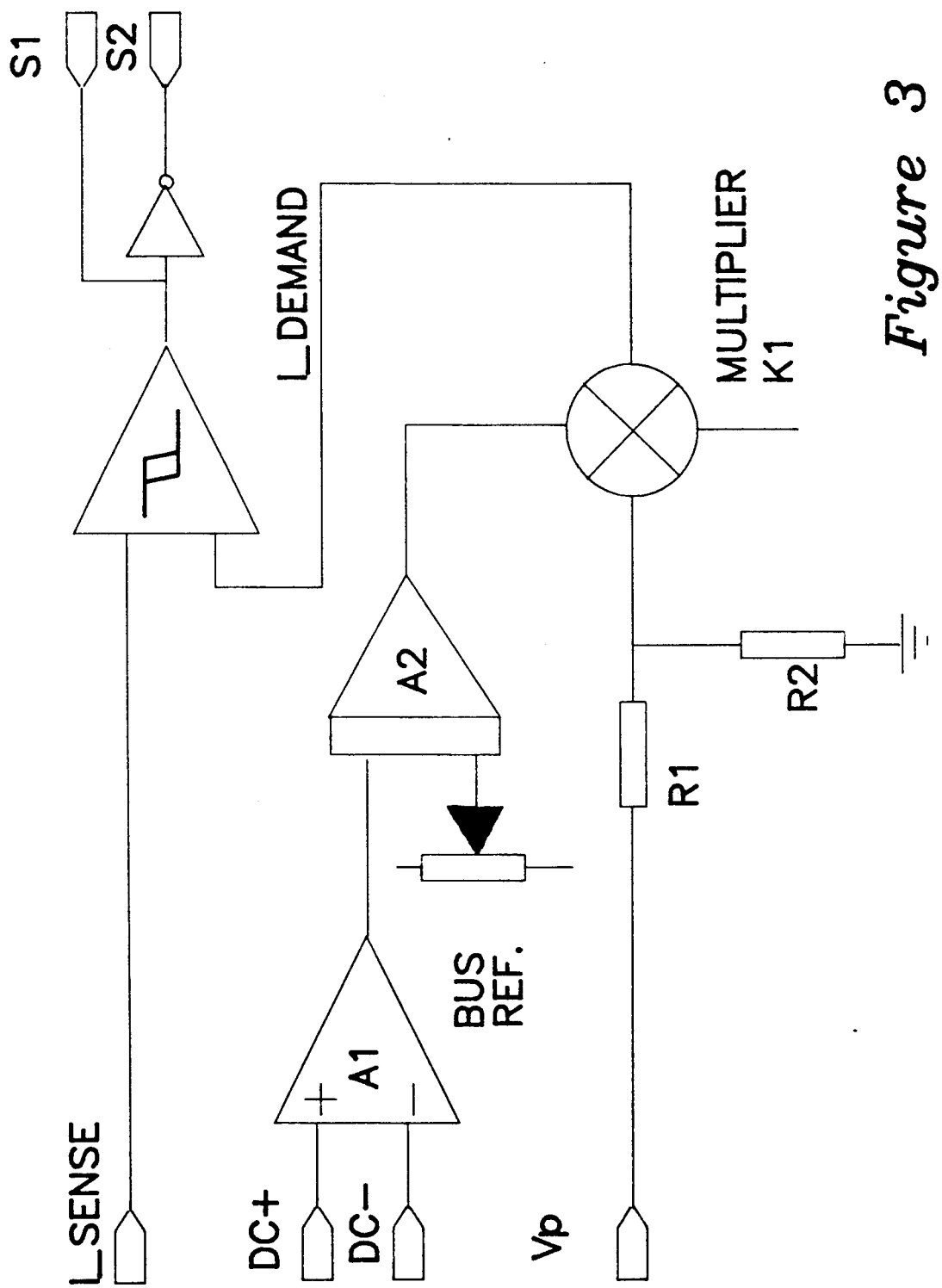
FIG. 3 is a circuit outline showing power control means for a reversible rectifier responsive to both positive and negative bus voltages, and sensed current.
Figure 11:
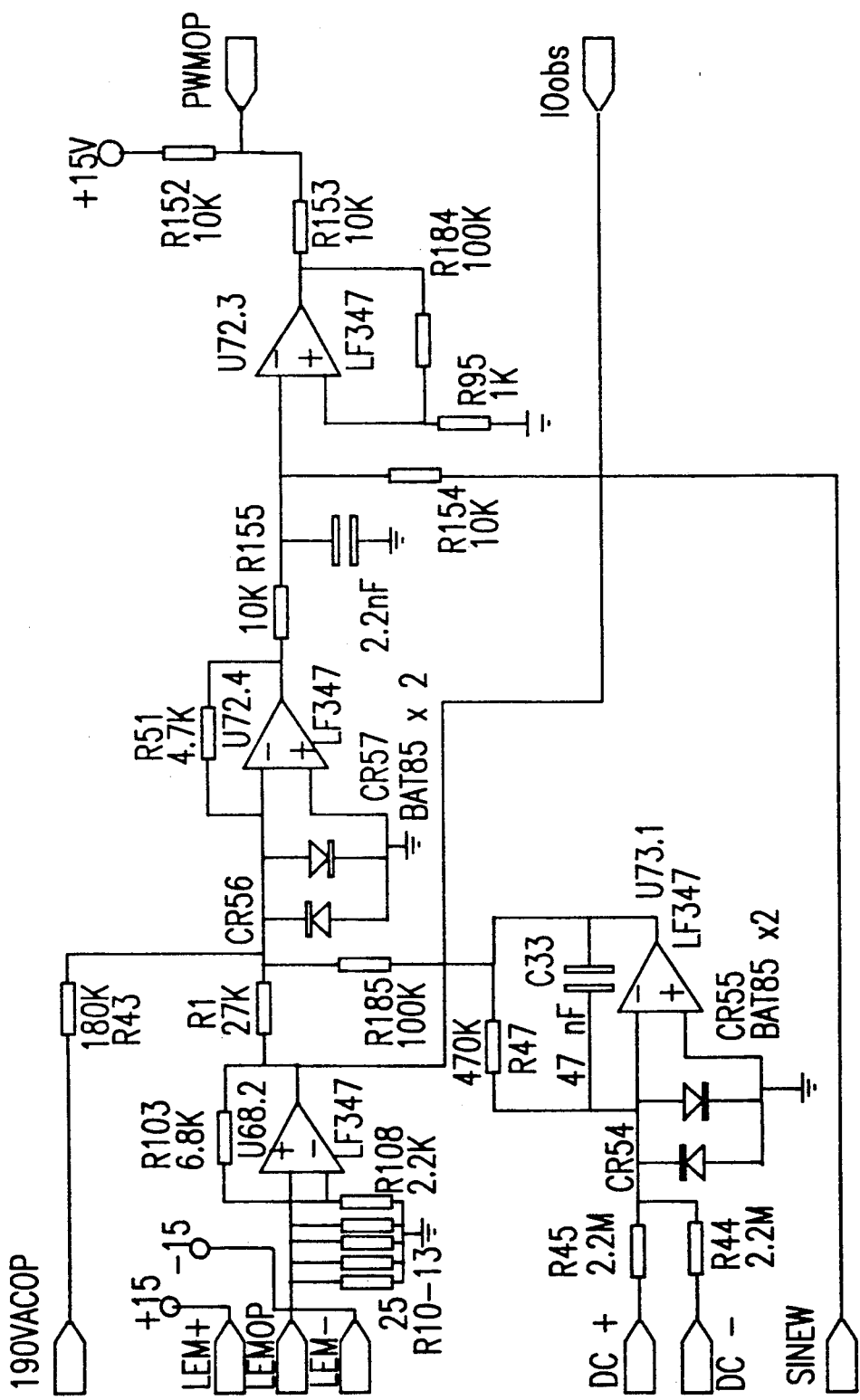
FIGS. 11 and 12 are practical embodiments of this Figure.
Figure 12:
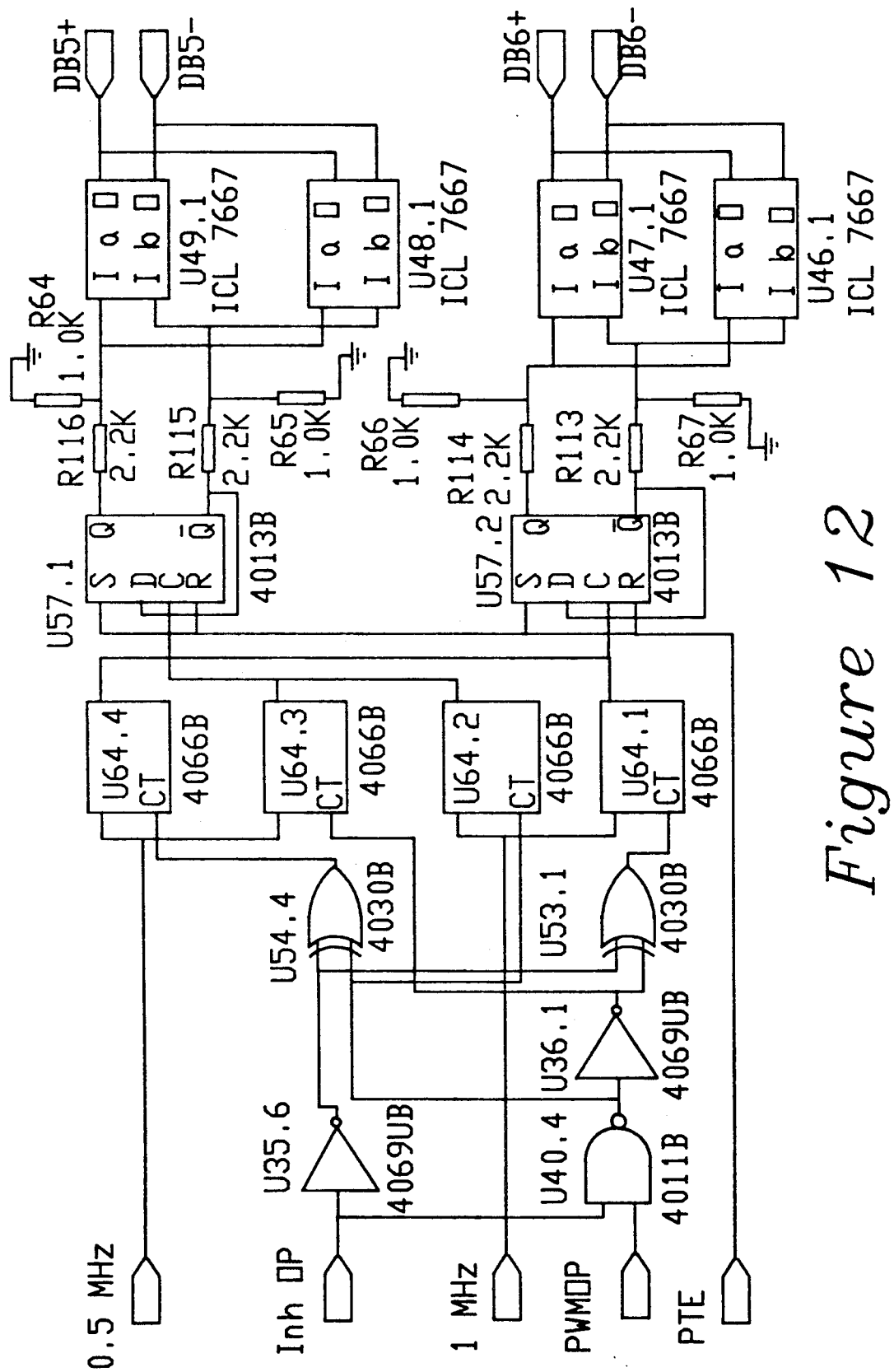
Figure 13:
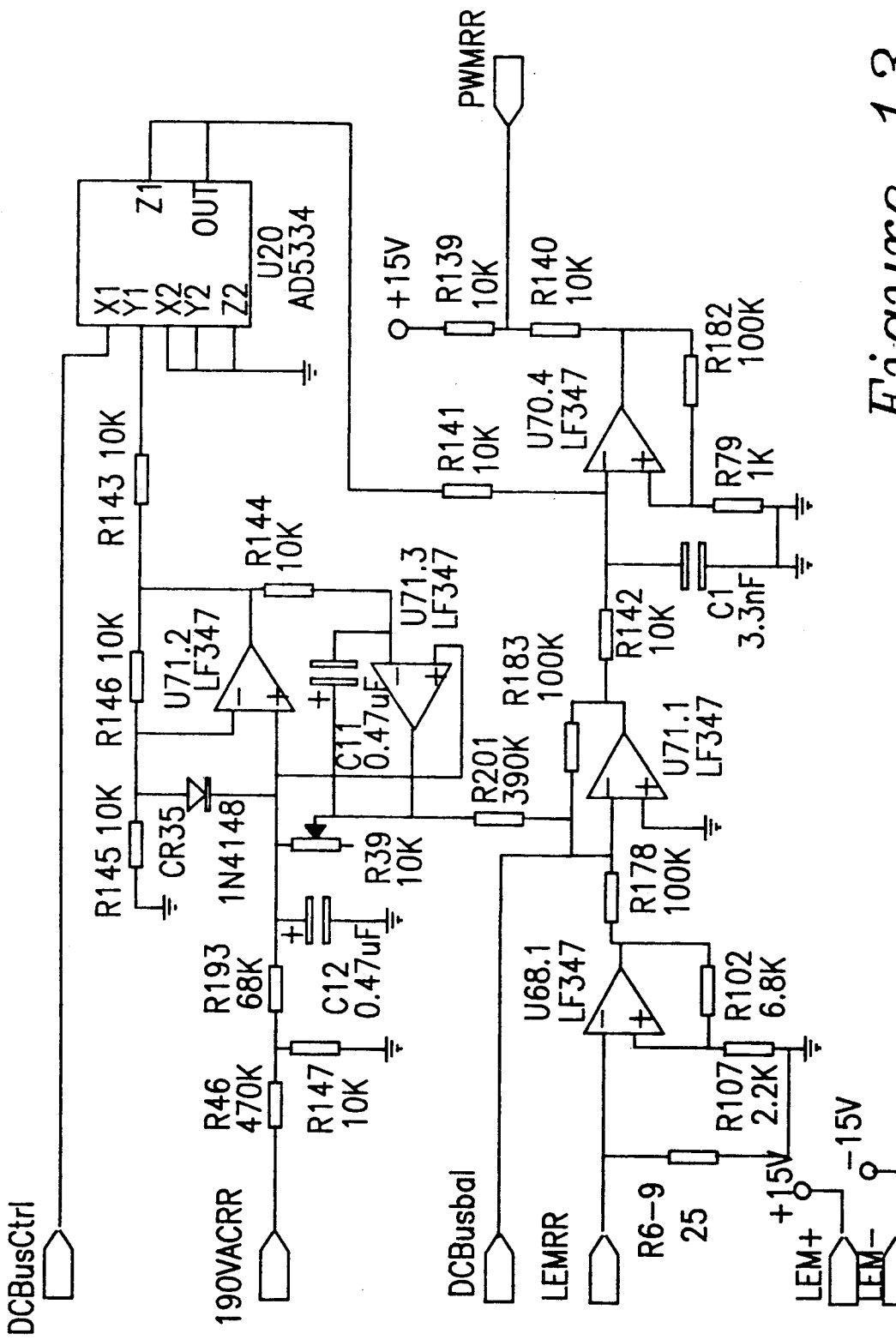
FIG. 13 is a circuit diagram of part of a preferred embodiment of the UPS, showing circuit elements involved with generation of a PWM-like waveform for control of the switches S1 and S2 at the input of the UPS.

FIG. 3 is a circuit outline showing power control means for a reversible rectifier responsive to both positive and negative bus voltages, and sensed current. (FIGS. 11 and 12 are practical embodiments of this Figure.)

Here the DC bus voltage is determined by differential amplifier A1 to give an output which is used as the input to PI controller A2. A2 is used to take the "proportional + integral" differences between the measured bus voltage (from A1) and the reference bus voltage as shown. The output of A2 is the power demand signal which is multiplied with a sinewave reference voltage formed from the phase voltage $V\phi$ (and scaled by the resistors R1 and R2) by the electronic multiplier K1 to give the current demand signal which is compared with the measured current signal I_SENSE using any of a number of well known current measurement techniques. If the sensed current is larger than the demand current I_DEMAND S1 is switched on to reduce it and vice versa. In this way the input stage maintains unity power factor while maintaining the DC bus voltage constant.

In practical circuits, owing to the limited maximum switching frequency of high-capacity switching units, a hysteresis band of perhaps 1-2% is inserted so that the response of the switching process is delayed and the output fluctuates about the intended value. This has the effect of causing the control pulses to resemble pulse-width modulation in that the duration of the pulses varies in accordance with the desired amount of current flow, but they are not tied to a fixed pulse rate. Further details of this switching technique can be obtained from the inventor's papers:

Current forced single-phase reversible rectifier, by Prof. J. T. Boys and A. W. Green, B. E., IEE PROCEEDINGS Vol 136 PT. B, No. 5, Sept. 1989.

Hysteresis current-forced three-phase voltage-sourced reversible rectifier, by A. W. Green, B. E. and Prof. J. T. Boys, IEE PROCEEDINGS Vol 136 PT. B, No. 3, May 1989.

With the higher bus voltages used in this invention, these hysteretically controlled reversible rectifiers operate in the current-forced mode.

BATTERY CONTROL STAGE

The fourth mode—the test mode—of operation for the battery charger stage will now be introduced. A special test-mode feature of the charger will allow the stage to act as though there is a total (full) power failure when none actually exists. In the preferred embodiment this is accomplished by altering the reference-bus voltage comparison relationship so that the controller for the battery-charger responds to a non-existent drop in bus voltage. The battery charger will put full power into the DC bus system so that the DC bus voltage will rise. In response to its own active feedback loop, the output of amplifier A2 in FIG. 3 will reverse sign and the current demand signal will therefore be formed with the opposite sense. No change in logic is required—the input stage will now transfer the excess power from the DC bus to the input mains supply. This reversible rectifier and controller combination permits a novel feature important in a UPS: namely that it allows full 100% testing of the battery without disrupting the performance of the unit. If a power failure should occur during this test it is a simple matter to disengage the test immediately—this is a function performed by the circuitry. As the output section of the system is presented only with a slightly raised bus voltage during this test, it can carry on synthesising an AC output as at any other time.

The battery charger stage operates in a very simple way. In float mode switches S3 and S4 generate a pulse width modulation (PWM)-like type of output to float the battery at the correct float voltage. A current limit on this mode of operation provides a simple charging profile at constant current with natural convergence to float mode as the battery voltage rises.

The discharge mode of operation uses a circuit exactly the same as FIG. 3 but with the bus reference reduced by 5% so that under normal circumstances the power demand from Amplifier A2 is always zero. Note that for the battery stage a negative output from A2 must be suppressed. Since the stage is a DC one no multiplier is required and the power demand may be used to control S3 and S4 directly by measuring the current in L2 and operating S3 and S4 to control the current according to the power demand signal. The fourth mode of operation is preferably initiated by changing the bus reference voltage in the battery charger stage by (say)+10%.

OUTPUT STAGE

The output stage operates in a very simple way. An output voltage sinewave reference signal is generated; preferably by analogue conversion of digital, stored data. If the instantaneous output voltage is greater than the reference voltage, S6 is turned on; if it is smaller, S5 is turned on. Since the output is obtained through inductor L3 and capacitor C3 this mode of operation may be unstable without current feedback. Current feedback is easily obtained by measuring either the inductor current or the capacitor current and adding a small fraction of this signal to the measured output voltage.

CONTROLS

The UPS is preferably controlled by a microprocessor and has appropriate user controls and displays. Apart from meters and lamps (e.g. LEDs) to provide warnings and show output volts and output current it is preferred that the UPS includes an LCD or other display capable of passing messages to the user. Communication ports may also be provided to supply messages to the computer system receiving power from the UPS. Typically the computer system will be programmed to close files and shut down in an orderly fashion if the UPS signals that a power outage has occurred —the battery capacity will typically be specified to provide an uninterrupted power supply of sufficient duration to allow the designated computer system to shut down without malfunction.

FIG. 4

Figure 4:
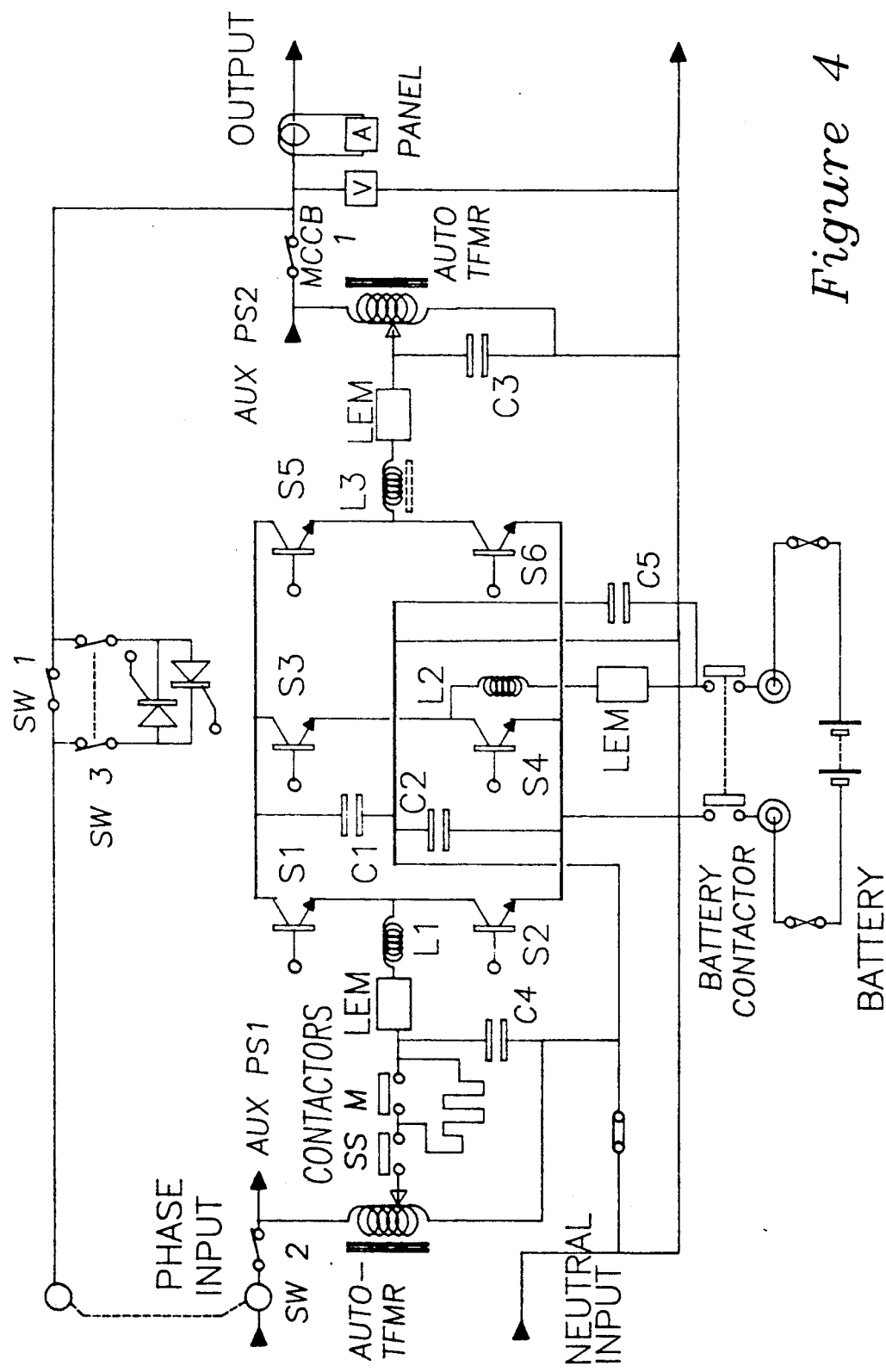
FIG. 4 is a circuit diagram of a preferred embodiment of the UPS, showing the components connected to the switches S1 ... S6 of FIG. 2, with the exception of control elements.

This figure has retained at its centre the essential elements of FIG. 2 and added surrounding supporting devices to become a complete, single-phase UPS—though the control elements driving S1 . . . S6 are shown only in later figures. In the centre of FIG. 4 the three reversible rectifier modules are retained as L1 with S1 and S2 for the input, as L2 with S3 and S4 for the battery controller, and as L3 with S5 and S6 for the output section. The actual switch units are series-paired Darlington-configured bipolar transistor units rated at 150A, 1200V, type 'FUJI'2DI150Z-120 and each such device comprises the pair of switches required for a single reversible rectifier.

The PHASE INPUT connection and the NEUTRAL are connected to the mains supply. To bypass the UPS an alternative link including a manual switch, and a contactor for the thyristors passes over the top of the Figure and is connected to the OUTPUT.

An autotransformer is employed at both input and output, to bring the working bus voltage by 12–15% from 230 V RMS to a level compatible with practical capacitor units, and also to render the UPS capable of operating at different mains voltages in different environments. It is not necessary; it is cheaper than higher-voltage-rated bus capacitors. In some instances, full isolation may be provided by a transformer with separate primary and secondary windings.

Both a soft-start (using a series resistance) and a main contactor are provided for starting up the device. Capacitor C4 serves to minimise reverse transmission of switching transients arising from the normal action of S1 and S2. The LEM device is used as a inductance current monitor for assistance in the control of S1 and S2. A LEM device is a type LT100 Hall-effect-based current sensor, accurate to 1% over 0–100 A, made by LEM SA, CH-1228, Geneva, Switzerland. The action of the reversible rectifiers connected to the positive and negative buses has been described with reference to FIG. 2.

Between L2 and the battery there is a second LEM device, and a battery contactor for maintenance purposes. The capacitor C5 serves to effectively minimise ripple current in the battery supply lines, as excessive ripple is known to damage batteries.

From the junction of S5 and S6 a further inductor is used in conjunction with C3 to filter out high-frequency components of the output from the switches S5 and S6. The output current passes through a third current monitor and finally though a second autotransformer, a main circuit-breaker, and a voltage and current monitoring panel to the OUTPUT point.

PREFERRED EMBODIMENT-DETAILS OF CONTROL FUNCTIONS

UPS Circuit Board Description

Overview

These circuit descriptions, which, it must be realised, are just one preferred embodiment of the invention, apply to prototype UPS units constructed in accordance with the invention. The control functions of the UPS consists of three closed loops. One loop endeavours to maintain the positive and negative buses at a certain voltage by drawing current from (or returning current to) the incoming mains supply, the second endeavors to maintain the buses by drawing battery current, (otherwise it maintains battery charge) and the third section endeavours to maintain the UPS output at a predetermined level by drawing current from the buses. Some of the interlinkage between these three loops is provided through a microcontroller, and some is provided by interconnections of analogue signals.

By simply altering the reference point of the second battery controller the user can force the battery to discharge into the incoming mains and thereby test the battery and the entire UPS under load.

Physically, the present UPS system consists of three main areas of circuit board. These are the Main Control Board (MCB), the Microprocessor board (consisting of 2 printed circuit boards) and the three driver boards—each containing a pair of circuits of FIG. 20.

Figure 5:
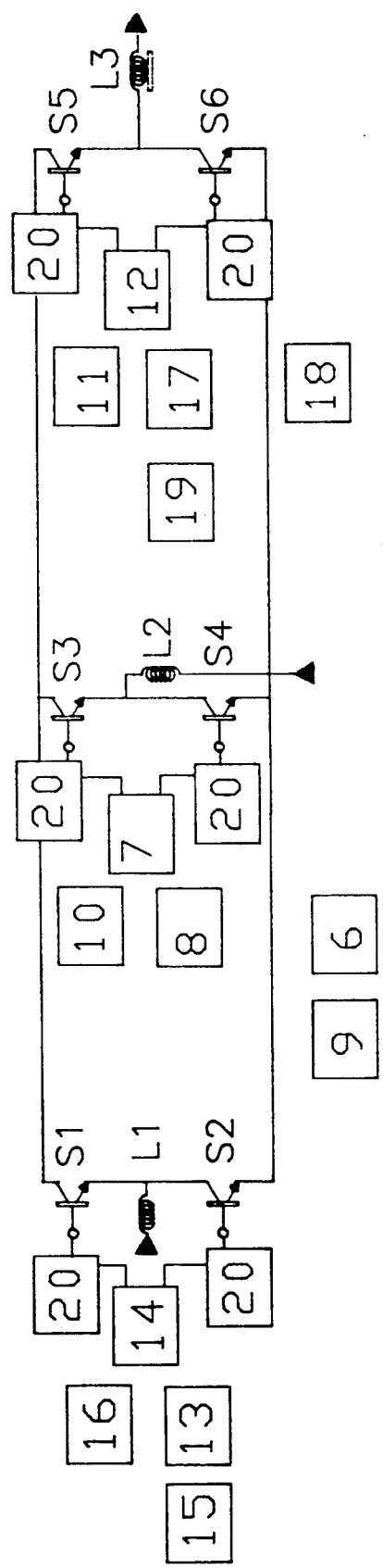
FIG. 5 is a block diagram of a preferred embodiment of the UPS, showing as blocks the controlling circuitry connected to the switches S1 ... S6 of FIG. 2.

In this description however, the circuit diagrams are discussed in terms of single pages; the relationships of each of which to the three control functions are given in the block diagram FIG. 5.

FIG. 5

This figure maps the control circuitry onto the centrally depicted set of six switches that comprises the core of the UPS, and complements FIG. 4. 20 pulse transformers and related circuitry (see FIG. 20) drive the actual switches with maintaining electrical isolation.

The input switches S1 and S2, together with the inductor L1 and the sensing and control circuitry in the blocks labelled 13, 14, 15, and 16, further revealed in FIGS. 13 to 16 comprise a reversible rectifier unit which endeavours to maintain the UPS buses at a certain DC voltage by either drawing current from, or returning it to the AC mains supply (mainly during battery tests) in a manner optimised to power utility requirements in that harmonic distortion (under 2%) or power factor effects (above 0.98) are minimal.

The battery switches S3 and S4 together with the circuits in FIGS. 6 to 10 and the inductor L2 comprise a second reversible rectifier unit which performs a DC to DC voltage translation function—not true rectification as such. Normally it is either charging the battery, or maintaining a float charge. If the bus voltages sag by more than 5% it is made to reverse-convert battery power into bus power, for that occurrence indicates that the incoming mains supply is now inadequate to maintain the buses. Furthermore, if the battery test mode is in effect, it forces this reversible rectifier to dump power into the buses, which in turn forces the first reversible rectifier to dump the bus power into the mains supply (so long as the mains is present).

Figure 17:
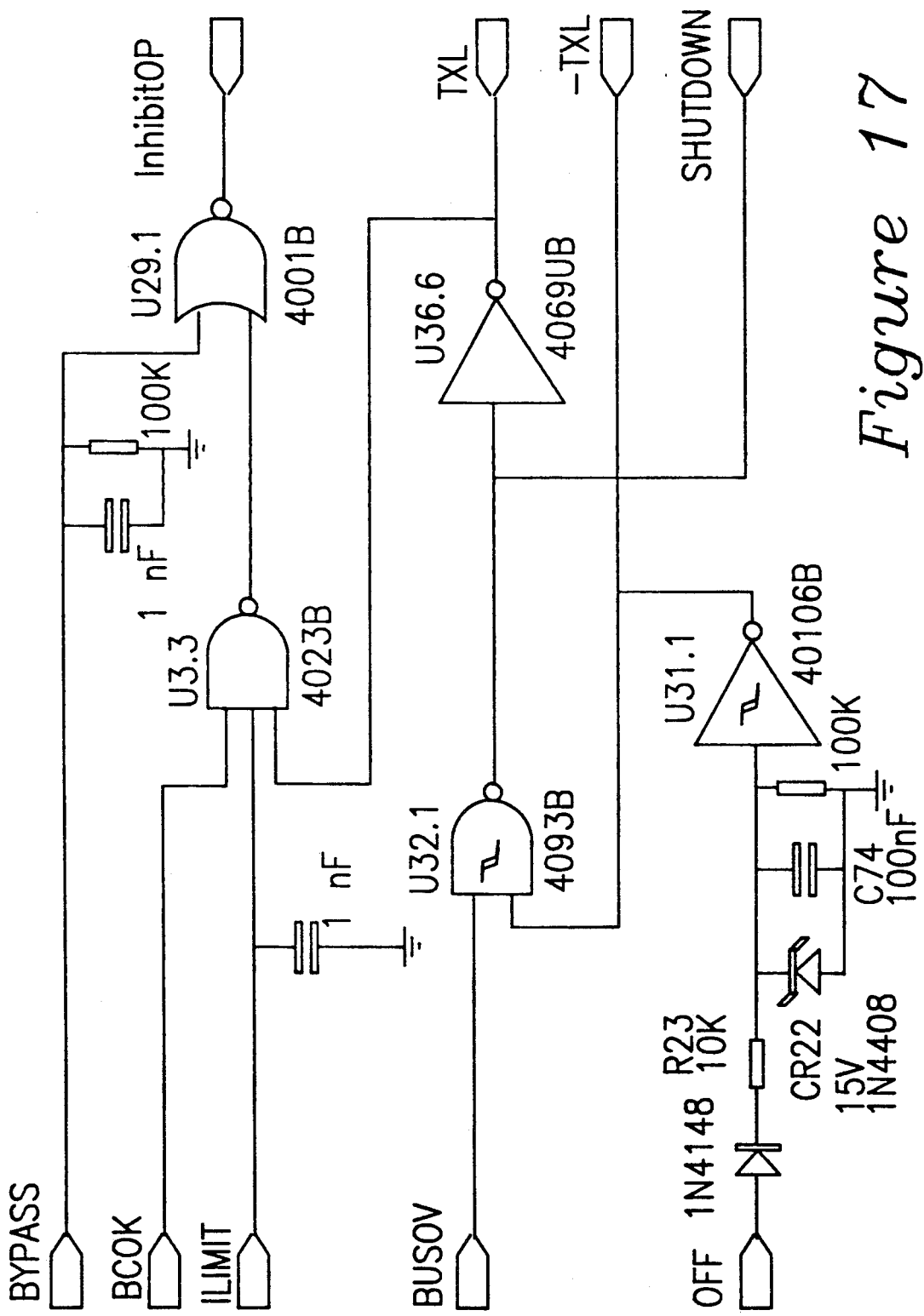
FIG. 17 is a circuit diagram of part of a preferred embodiment of the UPS, showing circuit elements used for protection, in particular over-voltage protection and for other alarm signals.

The output switches S5 and S6 together with the inductor L3 and the circuits in FIGS. 11, 12, and 17... 19 comprise a further reversible rectifier unit which simply has to convert the DC of the buses into constant-value (voltage and frequency) AC according to instantaneous demand—which includes even repetitive charging peaks intrinsic to rectification into a capacitive load.

FIG. 6

Figure 6:
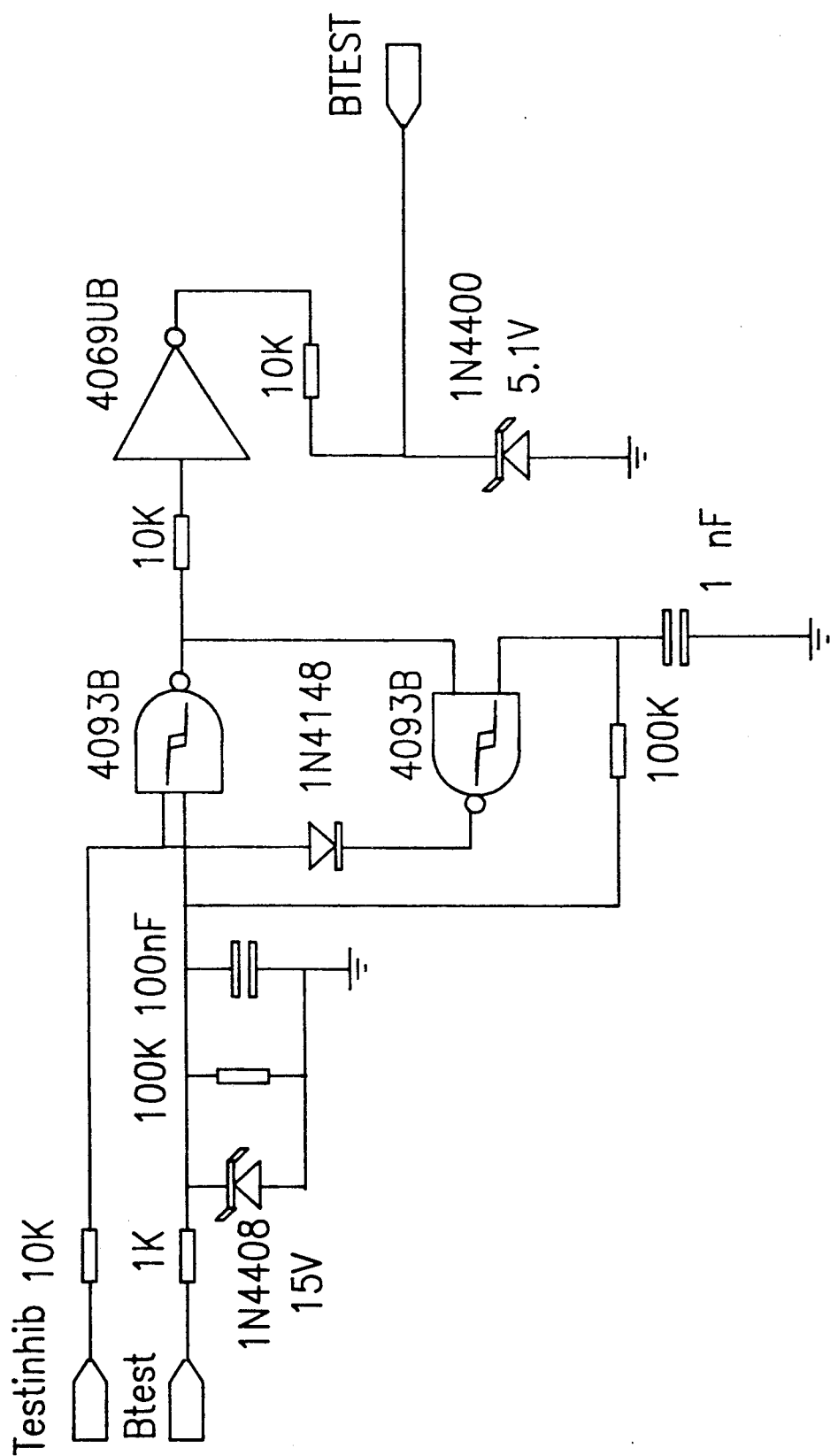
FIG. 6 is a circuit diagram of part of a preferred embodiment of the UPS, showing circuit elements involved with inhibition of the battery test mode under fault conditions (input mains not connected).
Figure 8:
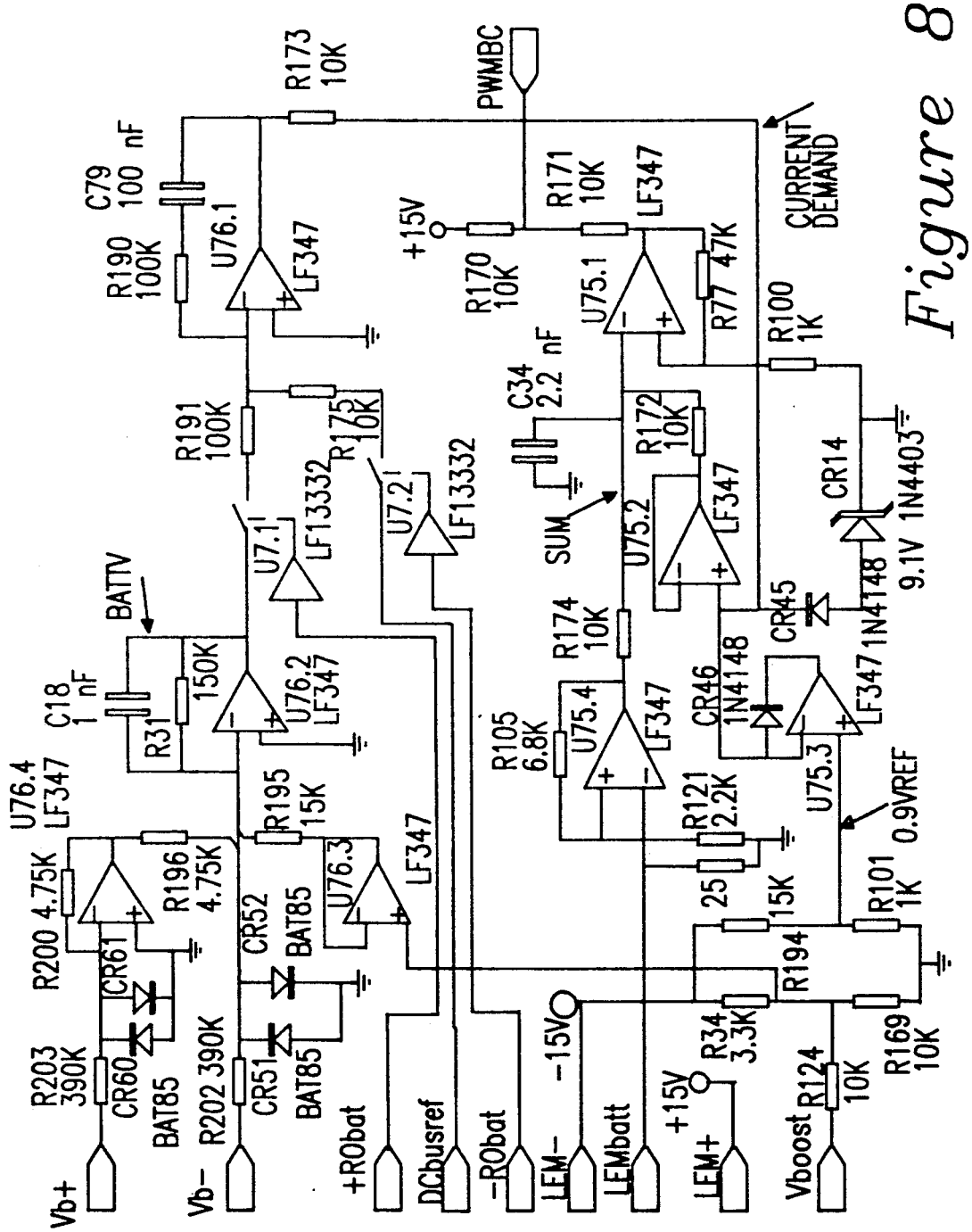
FIG. 8 is a circuit diagram of part of a preferred embodiment of the UPS, showing circuit elements used to generate the PWM-like pulses in response to battery voltage and current drawn, and the DC bus voltage. It also accepts a Vboost input.
Figure 9:
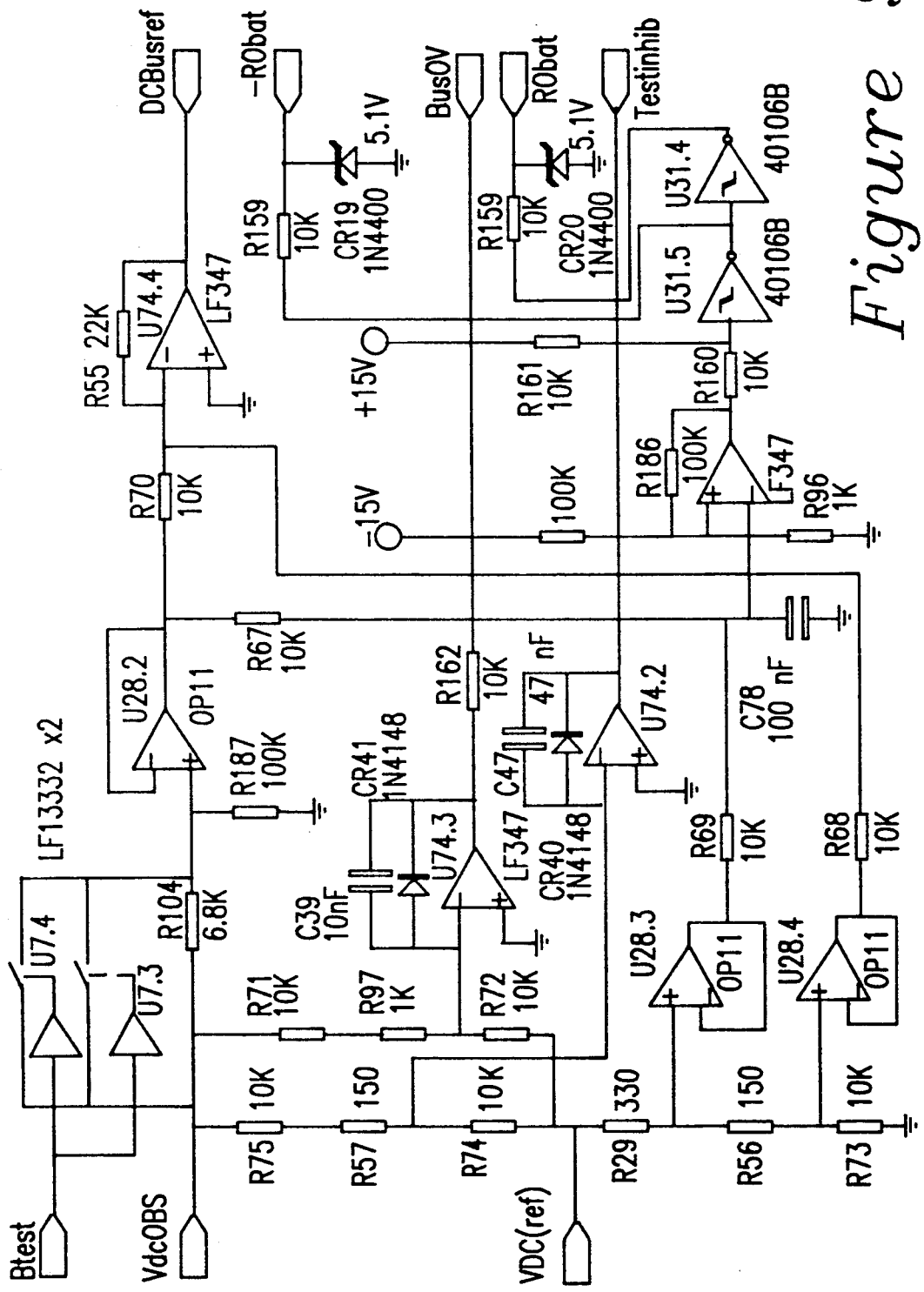
FIG. 9 is a circuit diagram of part of a preferred embodiment of the UPS, showing circuit elements used in conjunction with FIG. 6, to inhibit battery testing under fault conditions.
Figure 10:
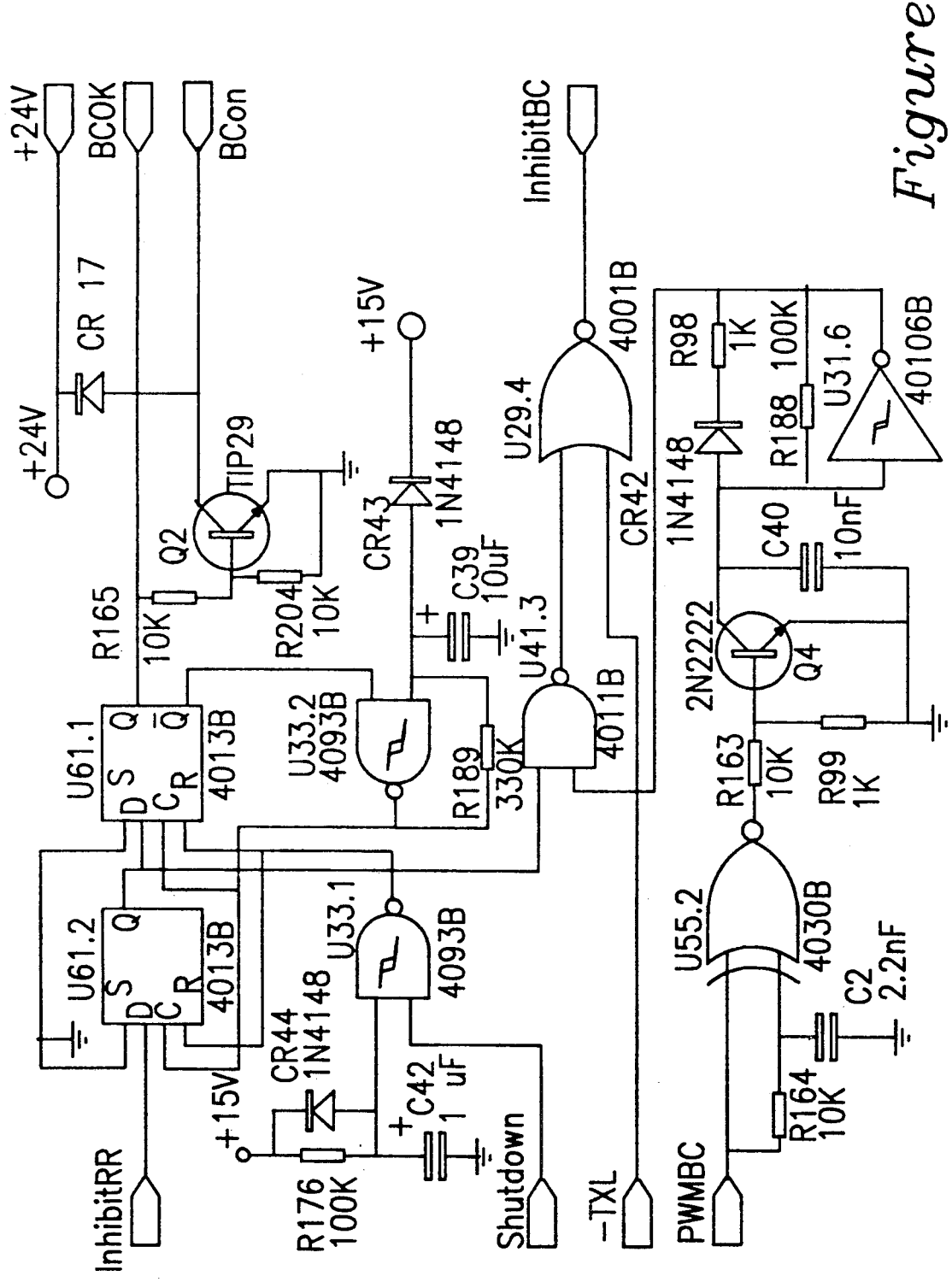
FIG. 10 is a circuit diagram of part of a preferred embodiment of the UPS, showing circuit elements which implement control functions, particularly during starting-up.

This circuit operates in conjunction with that of FIG. 9 to control that of FIG. 8, which is a circuit to generate PWM-like pulses that control the battery charger switches S3 and S4. FIG. 6 comprises logic circuitry to co-ordinate commands through the active-high Btest line with possible countermanding commands from the normally high Testinhib line—e.g. if the mains supply drops during a test.

The digital signal Btest emanates from an external source (the microprocessor board, in response to an operator's command) and is filtered and limited by R78, CR24, R125 and C43 and then fed into U33.4; a Schmitt-input CMOS NAND gate. When Btest goes high the signal is inverted by U33.4 then passes via R167 and is again inverted by the simple inverter U38.4 then limited to 5 V by R166 and CR21 (5 V1).

If signal Testinhib goes low indicating that the reversible rectifier S1, S2 can no longer hold the bus down to 700 V DC, this latches U33.3 and U33.4 via CR31 to turn the test off until signal Btest is released to the low state. R177 and C17 provide a 100 microsecond delay to allow the test to start before the lock circuit is enabled.

FIG. 7

This circuit comprises drivers for the pulse transformers for the power semiconductor switches S1 to S6 of FIGS. 4 and 5. It includes (1) logic for the startup and inhibitory functions, (2) inputs for 0.5 MHz and 1 MHz clocks, and (3) a PWM-like input to determine ON-times.

If the InhibitBC signal into the NAND gate U41.4 and the inverter U38.5 is low then transmission gates U65.1 and U65.2 will be enabled passing a 1 MHz (off) signal to both U62.1 and U62.2. If the InhibitBC signal is high then input PWMBC controls a 0.5 MHz (on) signal to be fed to either D-type flipflop U62.1 according to the level of PWMBC.

Input signal PTE is involved with startup. PTE is held high for about 2 seconds when the circuit is powered up and from then on will always be low. If it is high then all outputs of U62 (dual D-type CMOS flipflops) are held low and the driver boards will not be powered. This enables the clock circuit to start operating before the FSK signals are sent to the pulse transformer drivers (ICL7667—dual inverting power MOSFET drivers) which would be damaged by a DC signal.

High frequency FSK signals are fed into the D-type flip/flops (U62) via the clock input. The D input is connected to not-Q output so that a divide by 2 frequency division occurs. The dual-frequency (now 0.5 MHz/0.25 MHz) waveform is divided by resistor pairs R120/R91 etc and supplied at TTL levels to the ICL7667 driver circuits. The waveform at input 'a' shall always be the complement of that at input 'b' for each 7667 when PTE is not enabled. The ICL 7667 drivers are paired to provide extra drive power.

Figure 14:
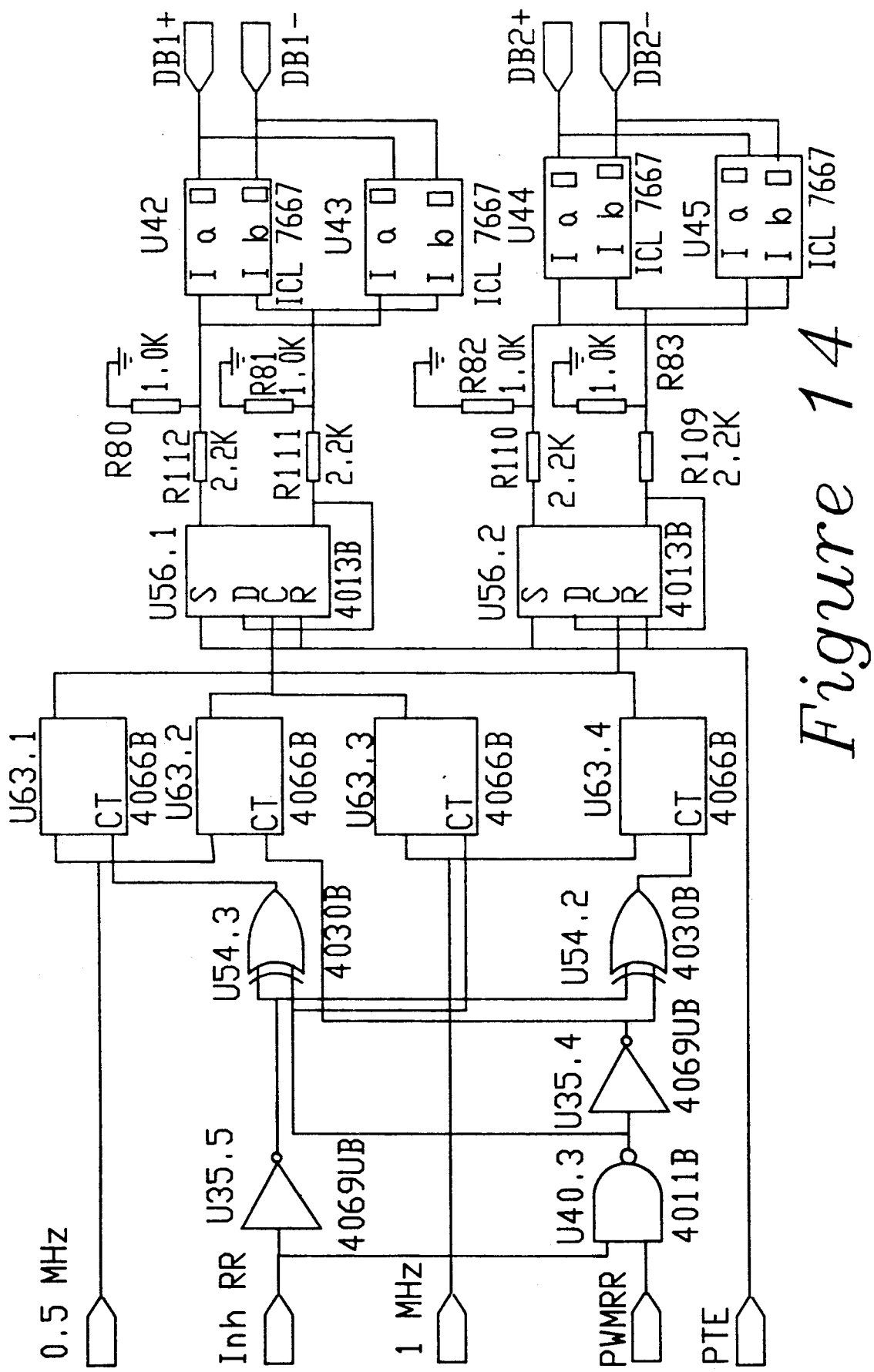
FIG. 14 is a circuit diagram of part of a preferred embodiment of the UPS, showing circuit elements used to drive the reversible rectifier switches S1 and S2, at the UPS input.
Figure 15:
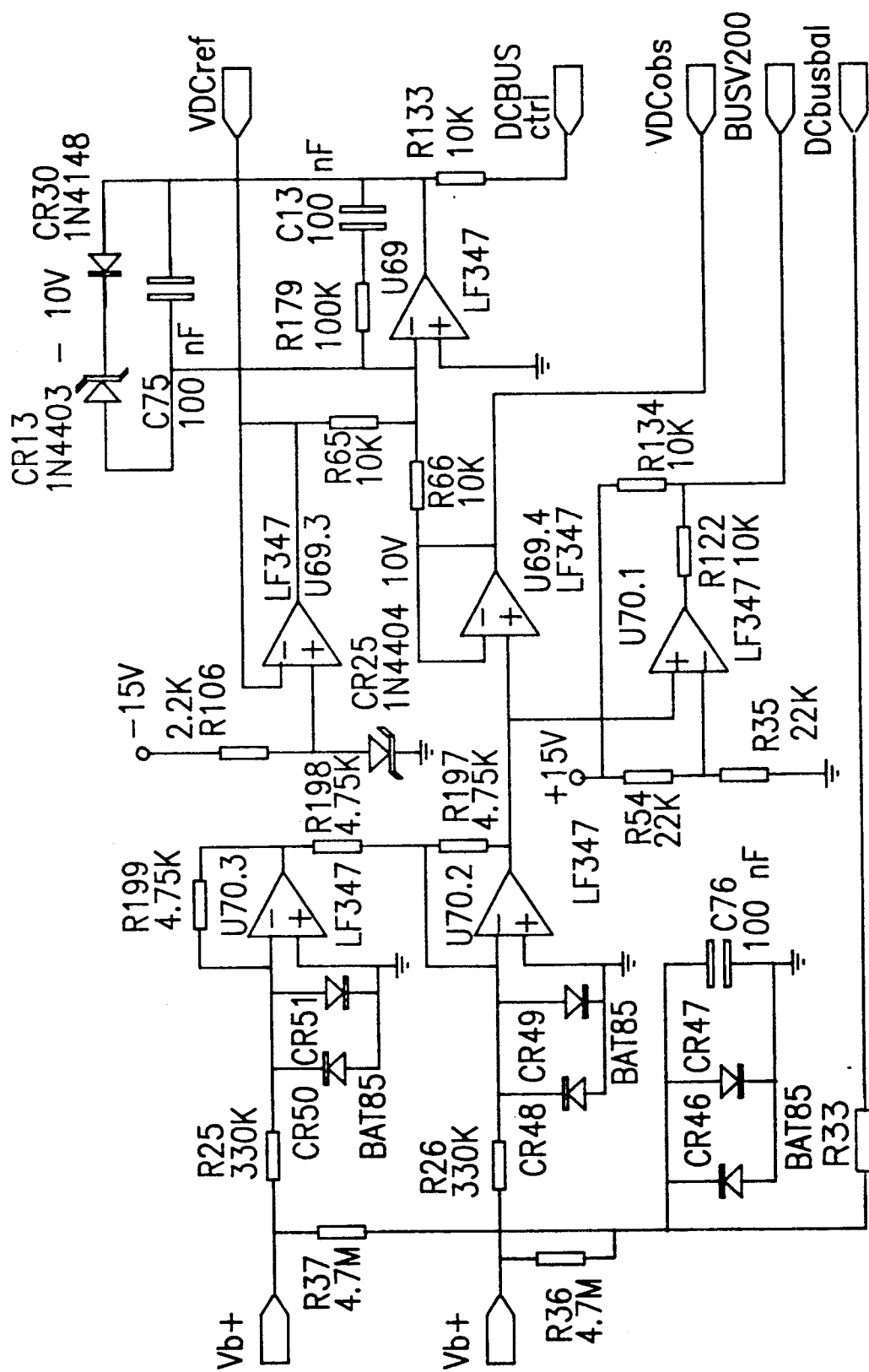
FIG. 15 is a circuit diagram of part of a preferred embodiment of the UPS, showing circuit elements used to supervise the internal high-voltage buses.
Figure 16:
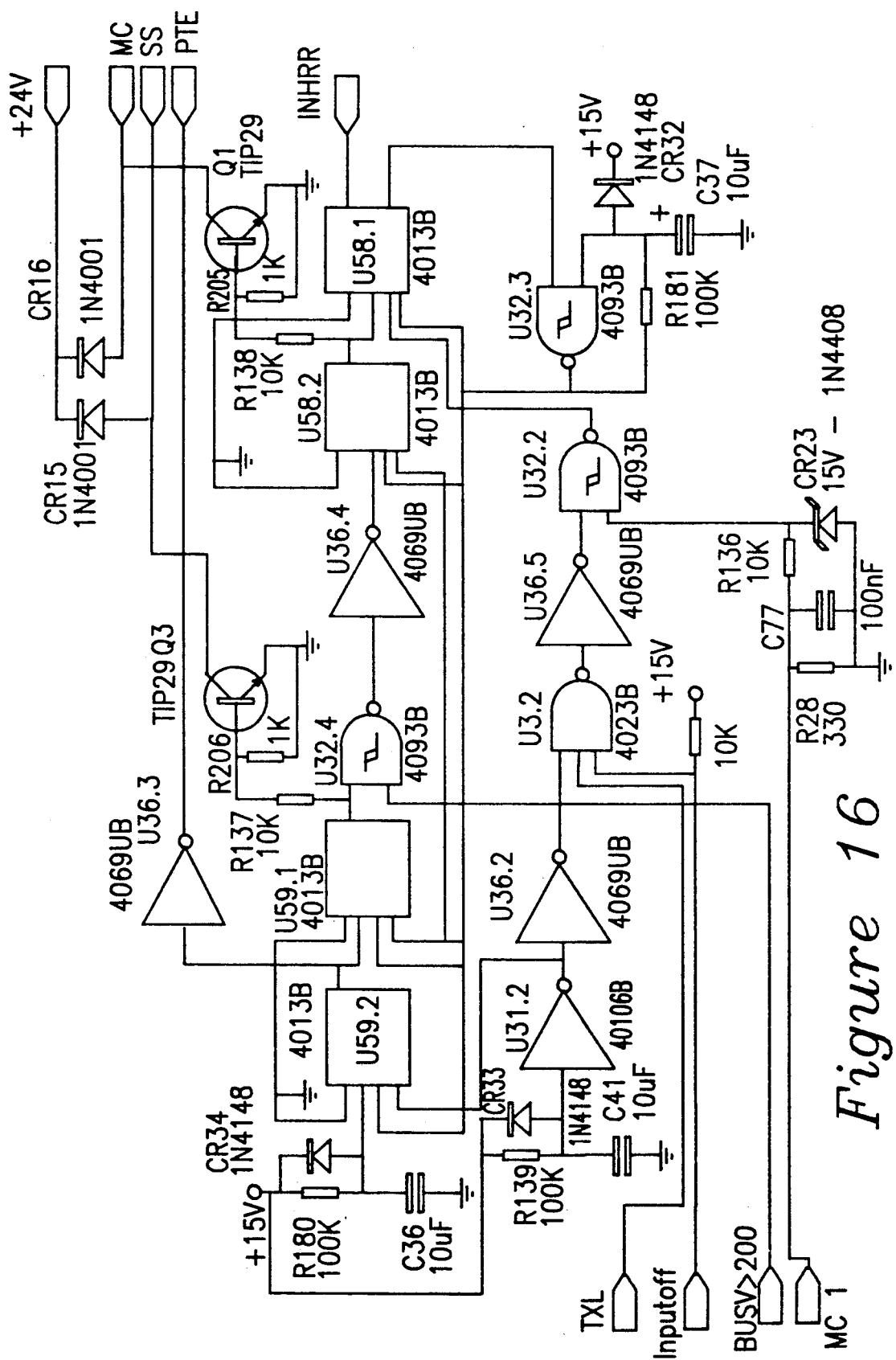
FIG. 16 is a circuit diagram of part of a preferred embodiment of the UPS, showing circuit elements involved with the soft-start process.

The circuit described here is identical to that for the drive stages of the Output and Input of the UPS—see FIGS. 12 and 14.

Figure 7:
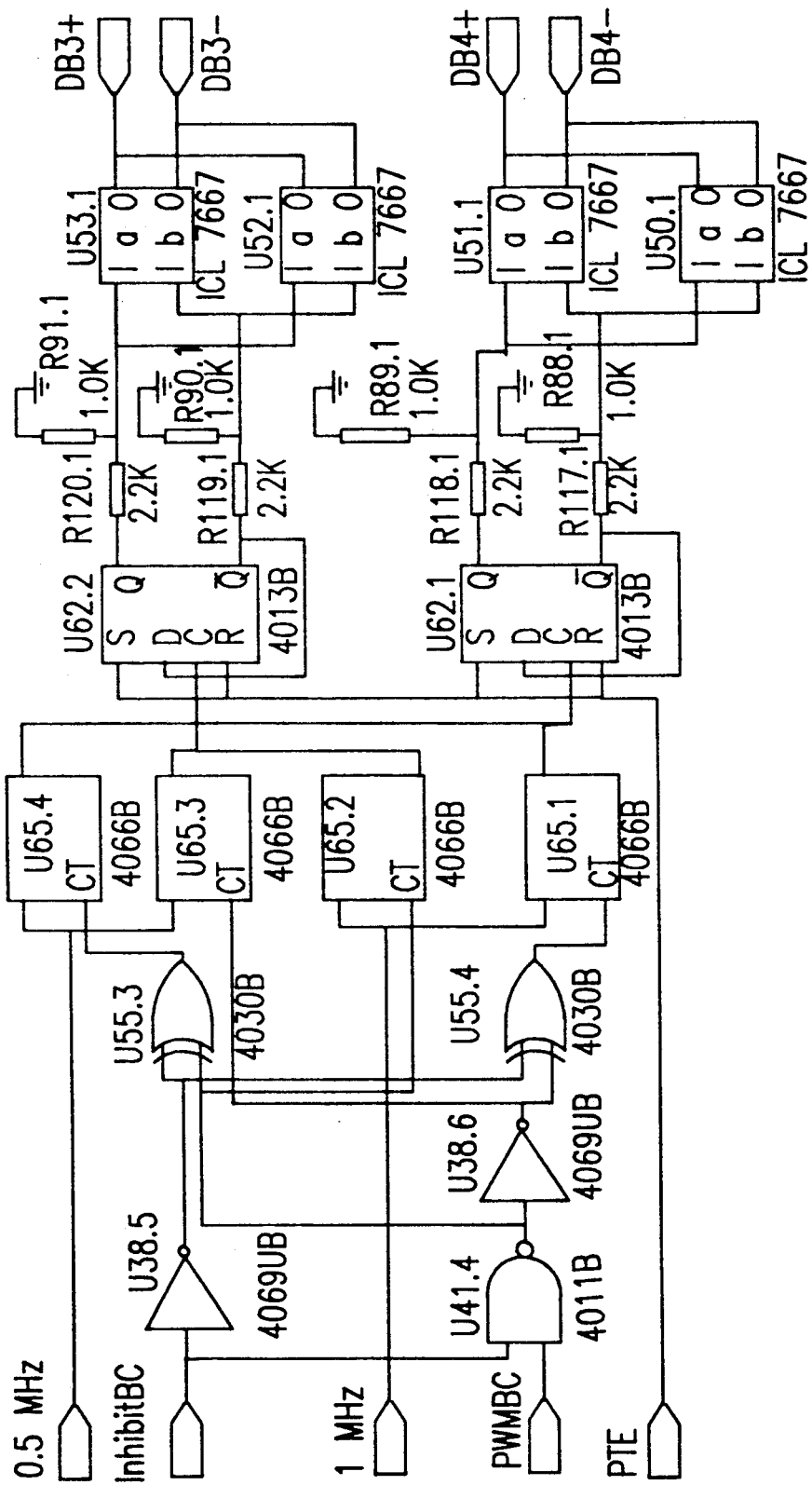
FIG. 7 is a circuit diagram of part of a preferred embodiment of the UPS, showing circuit elements used to drive the reversible rectifier switches between the buses and the battery.

The fate of the output signals from circuits in FIGS. 7, 12. and 14 is as outlined in the circuit description for FIG. 20—the actual floating interface for the reversible rectifier switches.

FIG. 8

This circuit affects the analogue control of the (+) and (−) battery voltages by taking the actual battery voltage as one input, battery current as another input, battery current flow commands as a third, plus a battery boost command, and emitting a type of PWM signal—actually a hysteretic control signal of non-stable frequency—for the purpose of reversible rectifier control. The output is passed to FIG. 7.

Resistors R202 and R203 reduce the battery voltage signal to compatible levels; protection diodes CR62/CR52 and CR60/CR61 respectively—low-power Schottky devices—are used to protect the amplifiers. R200 and R196 with the JFET quad operational amplifier U76.4 complete a summing circuit of the two battery terminal voltages Vb+ and Vb− at pin 6 of U76.2. R195 provides a reference voltage opposite in polarity from the observed battery voltage which is also summed to pin 6 of U76.2. U76.3 is a non-inverting buffer which is supplied with a battery voltage reference from the voltage divider R34/R169 which also allows the reference to be boosted via R124 by the microprocessor for boost charging of the battery to 2.33 volts per cell (VPC). Normal battery float voltage is 2.25 VPC for a 90 cell battery.

The output of U76.2 is the input to a frequency-restricted amplifier (with C18 and R31 in the feedback loop) which provides battery voltage float control (BATTV) at the preset reference. Transmission switches U7.1 and U7.2 (FET analogue switch devices) select either the battery float voltage signal or a DC bus reference signal from page 5 depending on whether power is to be drawn from the battery or returned to it. Either duly selected voltage level is fed through R191 (battery float) or R175 (bus support) to the input of the PI controller U76.1/R190/C79. The output is a battery current demand signal which is limited by CR45/CR14 at the characteristics of the LEM device to about 85A discharge and by the precision 0.9 V reference (R194/R101/U75.3/CR46) to about 9A charge current. This signal is buffered by U75.2 and passed via R172 to the PWM summing input 'SUM'—pin 2; the (−ve) input of U75.1.

Each LEM current sensor requires + and −15 V supplies and a load resistance of 25 ohms; made up of 4×100 ohm resistors in parallel. The battery inductor current is then amplified by U75.4/R105/R121 and passed through R174 to the point 'SUM'. C34 (2.2 nanofarads) is provided to limit the minimum switching pulse width to about 4 microseconds thus reducing the effect of circuit noise. Finally, the operational amplifier U75.1 produces a PWM type signal with about 2% hysteresis set by R77/R100 (47K/1K) which signal is level shifted by R170/R171 for subsequent logic circuits (FIG. 7) to pass to the transistor driver boards to the battery stage transistors. The amplifier U75.1 will aim to control battery inductor current to the level specified by the signal Currentdemand within the 2% hysteresis limit. Switch control is hysteretic and not at a fixed frequency like true PWM.

FIG. 9

This circuit includes some of the overall control functions for the UPS. It will block the battery test mode if the bus voltage reaches more than 1.5% over the design value, and will disable all switches and contactors if the bus voltage is more than 10% high. It also commands reversible rectifier direction (via the RObat lines) for the battery as when the DC buses if they become more than 1.5% low, and forms part of the battery test function.

Signals Vdc(obs) (the observed bus voltage) and Vdc(ref) (the reference bus voltage) are compared by the voltage divider R74/R75/R57 and if the bus voltage is or becomes more than 1.5% high, battery testing is stopped via U74.2/C47/CR40 using the line Testinhib. This is to prevent the input stage attempting to feed back into the supply when the mains is absent. The same signals are similarly divided by R71/R72/R97 to provide a bus overvoltage signal BusOV which is fed to logic within FIG. 17 via U74.3/C39/CR41 when the bus voltage is 10% high. The switching transistors S1-S6 and contactors will all be disabled if this occurs. Vdc(ref) is scaled by R29/R56/R73 to provide −1.5% and −3% reference voltages which are buffered by amplifiers type OP11 (U28.3 and U28.4) respectively. The −1.5% reference is provided to detect when the observed bus voltage as buffered by U28.2 compared via R69 and R67 is 1.5% lower than the desired bus voltage. If this is the case, the battery charger is operated in battery support mode. This signal is detected by U74.1 with 1% hysteresis fixed by the ratio of R186/R96 biased by 0.7% and filtered by C78. Biasing the signal by 0.7% means that the battery support voltage of the bus can be closer to the mains support voltage. improving performance. The signal is level shifted (R160/R161) and made digitally compatible as 'Testinhib' for use by the circuit of FIG. 6 by U31.4/U31.5 and finally limited to 5 V levels by R159/CR20 and R158/CR19.

The −3% reference is summed to the observed bus voltage by R70/R68 and buffered by R55/U74.4 before being sent as DCBusref to FIG. 8. The bus is floated 3% low by the battery support stage.

R104/R187 and the FET switches/transmission gates U7.3/U7.4 form the battery test function. Normally the transmission gates will be conducting with a combined impedance of less than 50 ohms; negligible compared to R187−100K. When the battery test is activated, the observed bus voltage is artifically divided by R104/R187 or by about 8% thus forcing the battery support mode to be entered. The battery will deliver maximum current into the bus and the regenerative rectifier input stage will regenerate into the mains (it has an independent DC bus reference).

FIG. 10

This digital logic contributes to overall control, especially at startup. Power cannot be applied to a series string of reversible rectifier switches unless they are already activated in a complementary fashion so no direct path exists through all of them. Thus, for instance, the battery may not be connected to an inactive UPS.

R176 and C42 provide a delay and reset pulse via U33.1 to the startup sequencing circuit U61.1/U61.2, made of a dual D-type flipflop. CR44 is a protection diode for U33.1 on power down. When signal InhibitRR goes high the 1 Hz clock circuit (U33.2/CR39/R189(330K)) signal will clock the high level first (pin 13 U61.2) to start up the battery stage drive circuits via U41.3/U29.4 through the connector InhibitBC then (pin 1 U61.1) enabling the battery contactor via R165/Q2/R204(10K)—the connector named BCOK.

Signal Shutdown resets the startup latches shutting down all transistors and disabling all contactors. SignalTXL inhibits all transistors.

Signal PWMBC is monitored by R164/C2 forming an RC delay line with U55.2—the exclusive-NOR gate—a configuration which produces a pulse on every PWMBC transition (battery stage PWM signal). Every transition discharges C40 via the Q4/R99/R163 network. If a transition does not occur within approximately 1 mS, R188 will charge C40 up sufficiently to produce a reset pulse on the output of U31.6. CR42 and R98 will limit the length of this pulse to 10 uS.

FIG. 11

The purpose of this circuit is to develop the PWM-like signals for hysteretic control of the output stage, and to be responsive to the output current, as detected by the LEM device, and also be responsive to the DC voltage in both buses.

Input LEMOP carries the output inductor current information. It is loaded by 25 ohms (R10-13; each 100 ohms) and amplified by U68.2/R103/R108 to give the output inductor current. This is fed via R27 to the summing point. The signal labeled 190VACOP, which carries the input power sinewave signal, is fed via R43 to the same summing point. CR56/CR57 protect the circuit from this high voltage signal. R44/R45 provide a DC bus balance signal protected by CR55/CR54 which is integrated by U73.1/R47/C33 to form a bus-balance controller. This signal is fed via R185 to the summing point completing the current control signal. U72.4/R51 sums and buffers the signal which is compared with the signal SINEW via R154/R155 and supplied to the comparator input pin 9 of U72.3. A small capacitor (2.2 nF) is added at the comparator input to prevent high-frequency noise transients from causing erroneous switchings of the output transistors. 1% hysteresis of the comparator is provided by R184/R95 and the signal is level shifted by R152/R153 before being supplied to driver board controlling logic as shown on FIG. 12.

FIG. 12

This circuit is for controlling the switches of the third, output reversible rectifier set, S5 and S6. It is the same as that described as FIG. 7; with different signal names and parts labels.

FIG. 13

This circuit is for control of the input stage reversible rectifier (S1, and S2 of FIGS. 4 and 5, for example). It has to be kept in step with the phase of the incoming mains. Signal 190VACRR carries that information, and is attenuated and filtered by R46/R147/R193/C12 before passing into the 50 Hz filter U71.2/R146/R145/CR35/R144/C11/U71.3 that is tuned by R39. The filtered 50 Hz sine wave is passed via R143 as one input to the analogue multiplier U20. (See FIG. 3 for an overview of the process). The input stage DCBusctrl signal is the other input to the multiplier. The processed, reference 50 Hz sine wave is multiplied by the bus control signal to produce a current demand signal which is supplied via R141 to the PWM-generating comparator U70.4.

The input current sensor is loaded with 25 ohms by R6-R9 (actually 4×100-ohm resistors), amplified by U68.1/R102/R107 and added to a small amount of 90 degree phase shifted input sine wave reference by R178/R201 to provide compensation for the input capacitor power factor. This signal is summed to the proportional bus balance signal DCbusbal then amplified by U71.1/R183 and compared to the current demand signal by R142/U70.4 with 1% hysteresis supplied by R182/R79. C1 limits the minimum switching pulse to about 4 μS. The input stage PWM signal PWMRR is level shifted by R139/R140 before being passing on to the driver board controlling circuitry (FIG. 14).

FIG. 14

This circuit, for the input switches S1 and S2, is the same as that described on page 3 with different signal names and parts labels. Controlling pulses emanate from FIG. 13's circuit.

FIG. 15

This circuit supervises DC bus voltage values. R36 and R37 sum both the DC bus values to provide a balance signal which is protected by CR47/CR48 and filtered slightly by C76 before passing to FIG. 13. See FIG. 18, which serves to ensure that the bus voltages are balanced about the central earth (neutral) value.

DC bus control signals are divided by R25 and R26 and protected by CR50/CR51 and CR49/CR48 respectively. The positive bus voltage is summed to pin 6 of U70.2 by U70.3/R199/R198 and this signal is buffered by U70.2 and R197 to provide −Vdc(obs). This signal is compared to a reference generated by R35/R54 within U70.1 which indicates to control logic when the bus has charged to a suitable voltage to bring in the main contactor. This signal is level shifted to 15 V/0 V by R122/R134 and passed on to control logic within FIG. 16.

The −Vdc(obs) signal is buffered by U69.4 and is compared to a reference generated by CR25/R106 buffered by U69.3 via R65/R66. This signal is supplied to pin 6 of U69.2 which forms a PI bus controller with R179/C13/C75. CR13/CR30 limit the magnitude of the current demand signal to 10 V. This signal (DCBUSctrl) is passed to the analogue multiplier in FIG. 13 via R133.

FIG. 16

This is concerned with the soft-start process.

R139/C41/CR33/U31.2 ensure that the dual D-flip-flop circuits U58/U59 are reset on powerup. R180/C36 form a delay circuit with CR34 as power-down protection. The signal is clocked through U59.2 by a 1 Hz clock circuit comprising U32.3/R181(330K)/C37 with CR32 power-down protection. The action of pin 13 of U59.2 going high enables the driver board drive circuits via U36.3. This high level is then clocked through U59.1 to enable the soft-start contractor via R137/R206(10K)/Q3/CR15. When the bus voltage is high enough (signal Bus V>200) this signal passes through U32.4/U36.4 to U58.2 where it is clocked through to U58.2 pin 13 enabling the main contactor via R138/R205/(10K)/Q1/CR16. If the main contactor auxiliary contacts are closed then MC1, R28/C77/R136/CR23/U32.2 will allow pin 1 of U58.1 to enable the input stage switching transistors and battery stage sequential startup within FIG. 10.

Signal TXL disables all contactors and transistors. Signal Inputoff disables all input contactors and the input transistors.

FIG. 17

This circuit relates to overvoltage protection and is the 'central point' for a number of related alarm signals.

Figure 18:
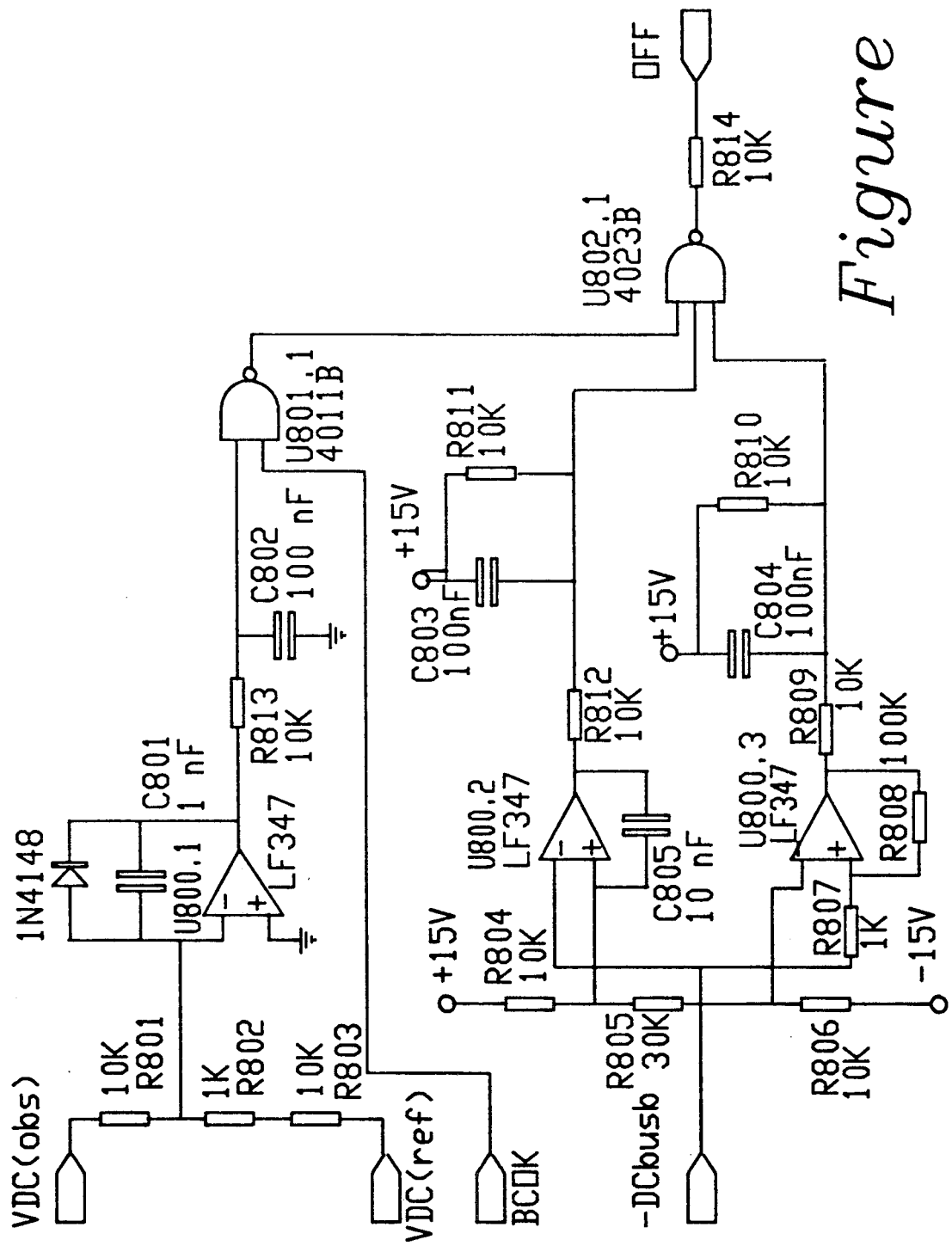
FIG. 18 is a circuit diagram of part of a preferred embodiment of the UPS, showing circuit elements used for protection, in particular against bus imbalance (of either side with reference to ground) of the capacitors.
Figure 19:
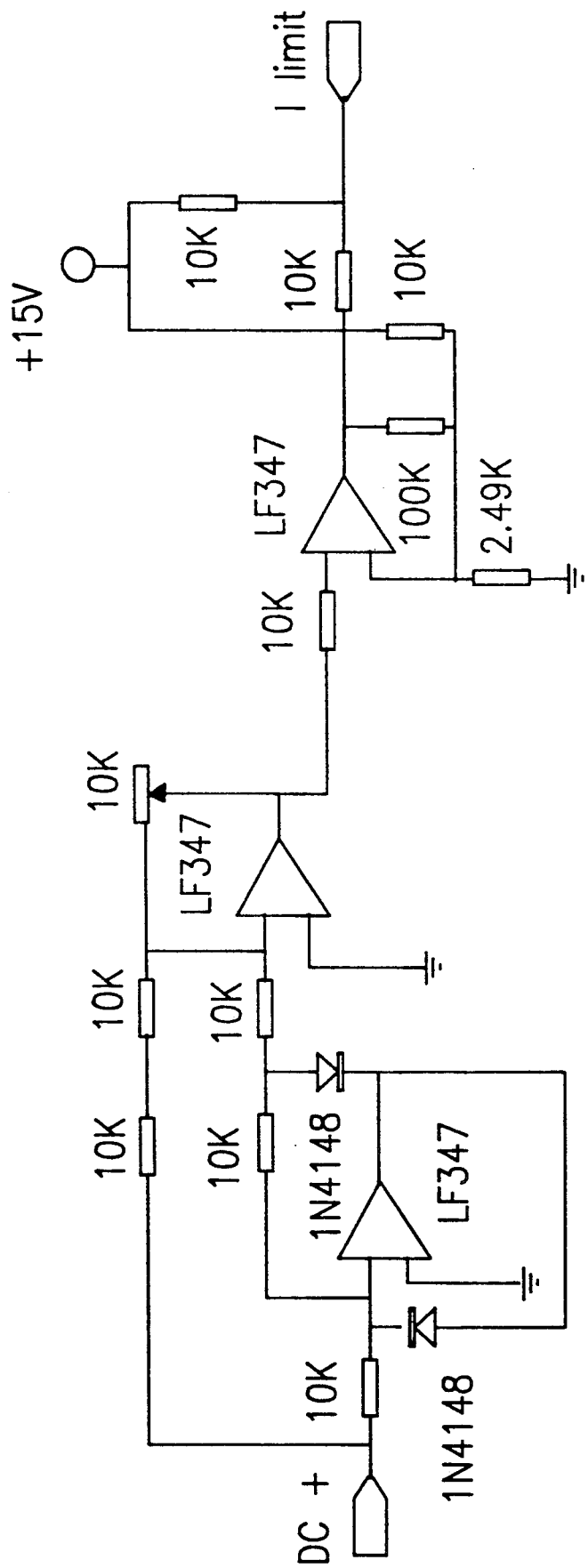
FIG. 19 is a circuit diagram of part of a preferred embodiment of the UPS, showing circuit elements used for component protection, in particular over-current protection of the output stage.

Signal OFF is provided with impulse protection by R123/C74 and is diode-'OR'ed with the bus undervoltage/out of balance signals from FIG. 18 before being limited by CR22 and filtered by C74. A 100K resistor in parallel with C74 ensures that C74 discharges when the OFF signal is inactive. U31 inverts the signal to an active low state to shut down the UPS. The power transistors are shut down via U32.1 and U36.6. (TXL and −TXL).

The BusOV signal (active low) from FIG. 9 indicates that the bus is in an overvoltage state so all transistors are shut down by U32.1 and U36.6 TXL (transistor lockout) is active low.

If either of the BCOK (Battery charger OK) signal or the Ilimit (output stage current limit) signal goes low U3.3 passes the signal to shut down the output stage power transistors via U29.1. The Bypass signal will also shut down the output via U29.1.

FIG. 18

This circuit is a recent modification attached to the version 2.0 UPS main controller board. Vdc(obs) is compared to Vdc(ref) and if Vdc(obs) is seen to be 10% low U800.1 in conjunction with a diode and capacitor will pass a high signal through a 10K resistor R813 to pin 6 of U801.1. If the battery contactor is enabled the UPS is shut down via U802.1. This modification is intended to shut down the UPS if the bus has collapsed for any reason.

Two references are generated from the +/−15 V supply and compared with the bus balance signal by U800.2 and U800.3 with a small amount of hysteresis. If the bus is out of balance by more than about 25 V, one of the op-amp output pins 7 or 8 of U800 will go high and after a small amount of filtering will shut down the UPS via U802.1. This circuit protects against any severe out of balance effect in the DC bus indicating some fault in the UPS and protecting the capacitor banks against overvoltage. Otherwise, the bus over-voltage protection only protects against the sum of the two halves of the bus being over-voltaged and not the case of a single sided over-voltage problem.

FIGURE 19

This circuit serves to create a shutdown signal Ilimit if the input signal IOobs indicates too high an output current.

The output inductor current IOobs is passed through a half wave rectifier circuit R58/R64/CR29/CR28/U69.1 to provide a series of negative half cycles which are summed to the input signal IOobs/2 giving a full wave rectified magnitude of output current signal. This signal is buffered at a set level R38/U68 before being compared with a reference voltage generated by R59/R30. A 2% hysteresis provided by R32. The output is a current limit signal which is level shifted by R132/R126 before being passed on to FIG. 17 where it shuts down the output stage transistors if the inductor current rises above a limit set by R38.

FIGURES 20a and 20b

The driver board, which is connected to the actual semiconductor switch and the semiconductor switch itself are shown in FIG. 20(a) and 20(b). The semiconductor switch is a 'FUJI'2DI150Z-120 unit, rated at 150 A, 1200 V, and comprises two individual sections—say S1 and S2, or S3 and S4, or S5 and S6 of FIG. 2. The associated circuitry as shown here is replicated 6 times in the entire UPS, and is driven by the circuits of FIGS. 7, 12, and 14.

These circuit elements, which actually drive the semiconductor switches, float at a high voltage and are powered by rectifying and smoothing the control pulses received through the pulse transformer. These control pulses arrive continuously but at either 0.5 or 0.25 MHz; the frequency determines whether the switch is to be closed or open. High frequency means 'open' thus stray impulses cause a fail-safe condition. Thus the circuit comprises means to decode the information and drive the power transistor/switch while at the same time being powered by those pulses.

A bridge rectifier plus a voltage doubler comprised of diodes D1-4 and D13-14 respectively are connected to the secondary of the pulse transformer PT. Pulsed data is coupled through the resistor R1 to an exclusive-OR gate acting as a buffer and pulse shaper; then to a second exclusive-OR gate generating one pulse at each transition of the incoming data. These pulses enter the 40193 counter, clocked by the crystal oscillator (X1 etc). Each pulse from the shaping circuit resets the 40193 counter (IC2). After four clock pulses the output Q3 goes high, and is connected to the 'D' pin of IC4—a flipflop. This remains high for a further four clock pulses; the next shaped pulse clocks the 'high' or '1' through to the 'Q' output (pin 1) of IC4 and resets IC2.

The rising edge at pin 1 clocks pin 12 (not_Q) of the second half of IC4 low. This releases the 4024 counter (IC6). After 16 further pulses Q5 of IC6 goes high, turning the main transistor ON with the aid of following circuitry. Q5 stays high providing that the incoming pulse train continues; note that it must exist for at least 16 cycles or it will not be used as an instruction.

High-frequency pulses, on the other hand, reset IC2 before it counts to the 'Q3 high' state. Also, an absence of pulses will cause IC5 to count freely until Q4 (pin 7) becomes set and the main transistor is then turned OFF.

Pulses to drive the main transistor are inverted by the 6 section of the 4049 in parallel. When their output goes low, Q3 starts to conduct. At some current, set by R10, Q2 starts to conduct also, thus Q2 and Q3 form a 'current source'. The buffer chain removes any stored charge from Q4 to cause fast turn-off.

For turnoff of the main switching transistor, Q5 and Q4 form a current source at a current set by R14, to withdraw stored charge from the base region. Current is also dumped via C7 and R12 into the gate of Q4, turning it on. The purpose of the multiple-buffer drive is to adequately drive the gate of Q4.

Transient-current limiting is also provided, via the components at the top right of this circuit diagram. When the main transistor is turned off, Q1 is cut off and pin 10 of the exclusive-OR gate IC3 is high. Q5 of IC6 is low, so that control of the reset line is under control of the first stage (pin 1) of IC4.

As the main transistor turns on, its collector-emitter voltage reduces and current is drawn via R7 to turn on Q1, causing pin 3 of IC3 to go low.

If the collector current of the switching transistor rises excessively and the voltage across it rises above 10V, Q1 will be cut off, so causing IC6 to be reset via IC4, quickly turning the main transistor OFF-where it remains until the next ON signal. This limiting circuitry is disabled for a few microseconds after each 'ON' command, either 4 or 8 microseconds, as determined by the link LK.

The two LEDs serve for visual indication of normal or abnormal activity; both should be equally bright in normal operation.

2. MICROPROCESSOR BOARD

The microprocessor board is an analog and digital interface board which monitors and controls the UPS main control board. The present functions of the microprocessor board are:
a. Monitoring of 7 UPS analog voltage and current signals.
b. Output waveform synchronisation.
c. Static Bypass, battery test and EPO (Emergency Power Off) control
d. Front panel interpretation and indication
e. Serial communication

OVERALL NOTES

The operational (+, −15 V) power supply and its connections to and within circuits (figures) and necessary decoupling capacitors to integrated-circuit packages, nor the grounding of unused pins have not been shown in this set of Figures. Generation of the reference sinewave by the microprocessor is carried out in the conventional manner by an A-D converter fed from a lookup table within a ROM.

PERFORMANCE

The prototype units were proven to operate with an input voltage within 15% of the rated value, a frequency within 10% of the rated value, a power factor of better than 0.98, a smooth 'walk-in' over 10 seconds (for generator compatibility) and a maximum current of 60 A. Battery voltage was 204 V.

The output was measured at 230 VAC, with a 1% frequency variation and a maximum slew rate of 1 cycle per second. The power rating of 10 kW was maintained. Steady state voltage regulation was 1%, was within 10% for an 0-100% step, and was within 3% at the second cycle. The output waveform had an approximately 3% total harmonic distortion.

The efficiency was measured at 87% from input to output; and the maximum heat dissipation (loss) was 1500 W.

CONTROLS

The UPS is preferably controlled by a microprocessor and has appropriate user controls and displays. Panel controls include means to start up and shut down the UPS, means to initiate a battery test, means (using the microprocessor) to evaluate the battery condition from the droop of voltage during the test. For emergency shutdown a pair of buttons which must be pressed simultaneously are provided. Apart from output voltage and current meters and lamps (eg LEDs) to provide warnings and show output volts and output current it is preferred that the UPS includes a character-based liquid-crystal or other display device capable of displaying messages to the user. Communication ports may also be provided to supply messages to the computer system receiving power from the UPS. Typically the computer system will be programmed to close files and shut down in an orderly fashion if the UPS signals that a power outage has occurred-the battery capacity will typically be specified to provide an uninterrupted power supply of sufficient duration to allow the designated computer system to shut down without malfunction.

BATTERY TEST MODE

This section brings together various descriptive material for the battery test mode from the body of the specification. It deals specifically with the means provided for testing during use of the battery and associated circuitry within this power supply apparatus.

In summary, the battery test mode for this preferred embodiment is provided by means of a user-initiated operating mode which (a) diminishes the apparent bus voltage levels as presented to the control circuitry for the battery reversible rectifier, consequently (b) forcing a known at least part of the charge stored within the storage batteries at full load into the internal bus or buses and back to the AC supply through the battery and input reversible rectifiers and (c) estimating battery condition on the basis of the battery voltage drop caused by a certain rate and quantity of discharge. During the test process, the output reversible rectifier continues to convert DC bus power, present at a slightly greater voltage into output power at the normal voltage and frequency.

Panel controls include means to initiate a battery test, means (using the microprocessor) to evaluate the battery condition from the droop of voltage during the test. Automatic safeguards provide against fault conditions during the test.

PRINCIPLES

The UPS of this preferred embodiment of the invention has three independent reversible rectifiers—each of which may be though of as an "intelligent" device that senses a controlled variable, compares it with a reference, and pushes power one way or the other attempting to make the variable match the reference. All of the reversible rectifiers connect with the internal bus or buses. There is an input, and output, and a battery reversible rectifier.

The output reversible rectifier (DC to AC) is effectively unidirectional, and is fed an AC reference voltage phaselocked to the incoming mains—a command forcing it to make a sinewave. The value of the output sinewave power is the sensed variable. It is relevant to the battery test mode in that it has the capability to maintain stable output power even when the internal bus voltages are altered (raised during test), so test may be carried out while the UPS is in normal use.

The battery reversible rectifier (DC to DC) is bidirectional and has three notional modes: charging, trickle-charging, and discharging the battery. Its sensed variable is the bus voltage—1.5% sag causes battery discharge.

The input reversible rectifier (AC to DC) is also bidirectional, and normally works to maintain the DC bus voltages at a constant level by taking power from the mains. Its sensed variable is the bus voltage. Conveniently for the battery-test mode it has the capability to pump substantial power back into the mains if the bus voltage is too high—as occurs during the battery test mode. Significant amount of power may be drawn from the battery without undue waste.

As a result of detecting the apparently sagging bus voltage, the battery reversible rectifier responds as it normally would to take significant power from the battery—which in this test mode is transferred through the bus or buses and partly into the mains and partly into any devices consuming power from the UPS.

DETAIL

The test mode of operation for the battery charger stage will now be described in more detail, as provided within the preferred embodiment. A special test-mode feature of the charger will allow the stage to act as though there is a total (full) power failure when none actually exists. In the preferred embodiment this is accomplished by altering the reference-bus voltage comparison relationship so that the controller for the battery-charger responds to a non-existent drop in bus voltage. If the bus voltages sag by more than 5% it is made to reverse-convert battery power into bus power, for that occurrence indicates that the incoming mains supply is now inadequate to maintain the buses. The battery charger will put full power into the DC bus system so that the DC bus voltage will rise. In response to its own active feedback loop, the output of amplifier A2 in FIG. 3 will reverse sign and the current demand signal will therefore be formed with the opposite sense. No change in logic is required—the input stage will now transfer the excess power from the DC bus to the input mains supply. This reversible rectifier and controller combination permits a novel feature important in a UPS: namely that it allows full 100% testing of the battery without disrupting the performance of the unit. Preferably the said battery control means allows substantial currents to be drawn from the battery when the UPS is replacing the usual mains power supply, or during tests so that the test simulates anticipated working conditions.

If a power failure should occur during this test it is a simple matter to disengage the test immediately—this is a function performed by the circuitry. As the output section of the system is presented only with a slightly raised bus voltage during this test, it can carry on synthesizing an AC output as at any other time.

Furthermore, if the battery test mode is in effect, it forces this reversible rectifier to dump power into the buses, which in turn forces the first reversible rectifier to dump the bus power into the mains supply (so long as the mains is present).

Part of the battery test-mode control means is illustrated in FIG. 6 which is a circuit diagram of part of a preferred embodiment of the UPS, showing circuit elements involved with inhibition of the battery test mode under fault conditions (e.g. if the input mains is not connected). Further parts of the battery test mode are illustrated in FIG. 9, another circuit diagram showing circuit elements used in conjunction with FIG. 6, to inhibit battery testing under fault conditions.

During use of the power supply apparatus, and in the event of a power failure the input stage is no longer able to maintain the DC bus voltage which therefore sags. When the sag reaches say 1.5% the battery control stage changes its mode of operation and maintains the DC bus constant at that 1.5% sag. During the battery test mode of operation this sag is caused to appear by upsetting normal working conditions for the input reversible rectifier, so that it returns power to the input mains connection by taking it from the internal buses.

FIG. 6

This circuit operates in conjunction with that of FIG. 9 to control the circuit of FIG. 8, which is a circuit to generate PWM-like pulses to control the battery charger switches S3 and S4. FIG. 6 comprises logic circuitry to co-ordinate commands through the active-high Btest line with possible countermanding commands from the normally high Testinhib line-e.g. if the mains supply drops during a test.

The digital signal Btest emanates from an external source (the microprocessor board, in response to an operator's command) and is filtered and limited by R78, CR24, R125 and C43 and then fed into U33.4; a Schmitt-input CMOS NAND gate. When Btest goes high the signal is inverted by U33.4 then passes via R167 and is again inverted by the simple inverter U38.4 then limited to 5V by R166 and CR21 (5V1).

If signal Testinhib goes low indicating that the reversible rectifier S1, S2 can no longer hold the bus down to 700V DC, this latches U33.3 and U33.4 via CR31 to turn the test off until signal Btest is released to the low state. R177 and C17 provide a 100 microsecond delay to allow the test to start before the lock circuit is enabled.

FIG. 9

This circuit includes some of the overall control functions for the UPS. It will block the battery test mode if the bus voltage reaches more than 1.5% over the design value, and will disable all switches and contactors if the bus voltage is more than 10% high. It also commands reversible rectifier direction (via the RObat lines) for the battery as when the DC buses if they become more than 1.5% low, and forms part of the battery test function.

Signals Vdc(obs) (the observed bus voltage) and Vdc(ref) (the reference bus voltage) are compared by the voltage divider R74/R75/R57 and if the bus voltage is or becomes more than 1.5% high, battery testing is stopped via U74.2/C35/CR40 using the line Testinhib. This is to prevent the input stage attempting to feed back into the supply when the mains is absent.

When the battery test is activated, the observed bus voltage is artificially divided by R104/R187 or by about 8% thus forcing the battery support mode to be entered. The battery will deliver maximum current into the bus and the regenerative rectifier input stage will regenerate into the mains (it has an independent DC bus reference).

ADVANTAGES OF THE PREFERRED EMBODIMENT

Figure 1:
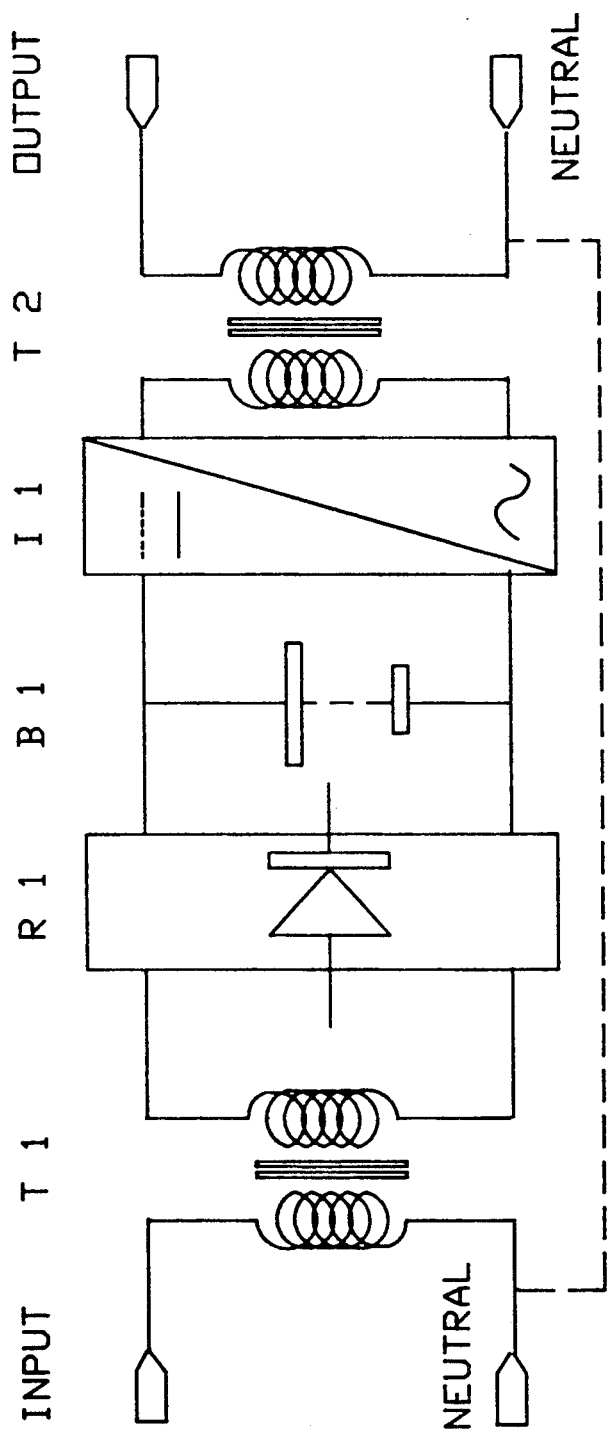
FIG. 1 is a schematic circuit diagram illustrating a conventional UPS.

A feature of the UPS shown in FIG. 2 is that the neutral may be continuous through the system (if so required). Alternatively the neutral can be isolated by suitable transformers. Input and output voltages may be transformer coupled as shown in FIG. 1 but with the continuous neutral these transformers may be low cost autotransformers. The inputs and outputs may be different frequencies and different voltages without restraint while leaving the internal working of the UPS unaffected.

The main features of this UPS which distinguish the technology from that presently available can be summarised:

1. The use of an internal DC bus voltage not directly related to the Input, Output or Battery voltages is a unique feature which allows cost effective use of power switching devices while facilitating the next two features.

2a. The use of a reversible rectifier input stage in conjunction with the independent DC bus enables a full-load battery test without affecting the concurrent UPS load.

2b. The regenerative rectifier permits the UPS to draw a unity power factor current from the reticulation network with very low distortion, while at the same time highly non-linear loads can exist at the UPS output.

3. The use of a modular design allows the UPS to readily cope with:
    a) different input and output voltages and/or frequencies;
    b) a battery voltage which is less than the bus voltage allowing for less complex batteries (i.e. fewer cells) and hence greater battery reliability;
    c) multiple input and/or output stages connected to the DC bus. This invention can be used for different capacity UPSs. By way of example we have designed a prototype 10 kW UPS having an input and output voltage of nominal 230 volts single phase AC, with a full load of 50 amps at nominal input voltage. This has a bus voltage of 700 volts DC suppled from the input or from a nominal 90 cell lead acid battery having an output of 203 to 157 volts (between 2.25 volts per cell at float voltage down to 1.75 volts per cell at the end of the discharge cycle). Such a battery is preferably configured as a 10 kW 10 minute battery to enable the computer system to be automatically shut down during power outage.

Finally, it will be appreciated that various alterations or modifications may be made to the foregoing without departing from the spirit or scope of this invention as exemplified by the following claims.

I claim:

1. A power supply apparatus comprising an input stage, a storage stage, an output stage, and at least one common bus; wherein:
    said input stage includes an input from an AC supply, means for reversibly converting an incoming alternating current at first AC voltage into a direct current supplied to said at least one common bus at a DC bus voltage which is higher than said first AC voltage, and means for controlling said DC bus voltage;
    said storage stage comprises means for controllably storing charge which in use allows the charge to be returned to said at least one common bus to maintain the DC bus voltage within predefined limits; and
    said output stage includes means for regulating an output voltage.

2. A power supply apparatus as claimed in claim 1, wherein said storage stage comprises storage batteries, a reversible DC-DC converter between said at least one common bus and said storage batteries, and means for controlling the said reversible DC-DC converter to allow in use either (a) the batteries to draw current from said bus for charging or maintaining the charge in said batteries or (b) the batteries to supply current to said bus.

3. A power supply apparatus as claimed in claim 2, wherein battery test means is provided which in use allows the storage batteries to be tested under full load by causing said batteries to discharge power into said at least one common bus for a limited time and back into said AC supply via said reversible converting means, and means for monitoring the extent of battery voltage drop so caused.

4. A power supply apparatus as claimed in claim 3, wherein the or each of said reversible converting means comprises a reversible rectifier having a pair of switches in series and driven in a complementary fashion, and means for controlling the duty cycle of switches therein.

5. A power supply apparatus as claimed in claim 4, wherein said means for controlling said DC bus voltage comprises reference means for comparing said DC bus voltage with an internal reference, and means for controlling said reversible rectifier by varying the duty cycle of said switches.

6. A power supply apparatus as claimed in claim 5, wherein said means for controlling said reversible DC-DC converter comprises signal comparison means for comparing a signal proportional to said DC bus voltage with a signal which is proportional to the voltage of said storage batteries, and means for switching said reversible DC-DC converter in response to said signal comparison means.

7. A power supply apparatus as claimed in claim 6, wherein said battery test means includes means for biasing one of said signals relative to the other to simulate a lower DC bus voltage thereby causing discharge of said storage batteries.

8. A power supply apparatus as claimed in claim 7, wherein said output stage provides at least one regulated AC output, and said output stage includes means for reversibly converting said direct current from said at least one common bus to said regulated AC output at an output voltage which is less than said DC bus voltage.

9. A power supply apparatus as claimed in claim 8, wherein the input stage includes a transformer connected between said input from the AC supply and said reversible converting means.

* * * * *